(12) United States Patent
Kurihara et al.

(10) Patent No.: US 11,724,392 B2
(45) Date of Patent: Aug. 15, 2023

(54) PROGRAM GENERATION DEVICE CONFIGURED TO GENERATE OPERATION PROGRAM INCLUDING OPERATION SYMBOL OF ROBOT APPARATUS

(71) Applicant: FANUC CORPORATION, Yamanashi (JP)

(72) Inventors: Yuusuke Kurihara, Yamanashi (JP); Gou Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/073,560

(22) Filed: Dec. 2, 2022

(65) Prior Publication Data

US 2023/0088295 A1    Mar. 23, 2023

Related U.S. Application Data

(63) Continuation of application No. 17/096,971, filed on Nov. 13, 2020, now Pat. No. 11,541,536.

(30) Foreign Application Priority Data

Dec. 9, 2019    (JP) .................................. 2019-222385

(51) Int. Cl.
*B25J 9/00* (2006.01)
*B25J 9/16* (2006.01)

(52) U.S. Cl.
CPC .................. *B25J 9/1658* (2013.01)

(58) Field of Classification Search
CPC .................. B25J 9/1658; B25J 9/1656; G05B 2219/40091; G05B 2219/40099; B23K 9/287; B23K 9/32
See application file for complete search history.

(56) References Cited

U.S. PATENT DOCUMENTS

2016/0279790 A1 * 9/2016 Meier .................. G05D 1/0088
2018/0154517 A1    6/2018 Park et al.

FOREIGN PATENT DOCUMENTS

JP    2018149206 A    9/2018
JP       6498366 B1    4/2019

* cited by examiner

*Primary Examiner* — Ian Jen
(74) *Attorney, Agent, or Firm* — Hauptman Ham, LLP

(57) ABSTRACT

A program generation device includes a display; at least one memory configured to store an operation symbol including information in relation to an operation command of a robot, and an auxiliary symbol including information in relation to a control command for adding an operation of the robot or for correcting the operation of the robot defined by at least one operation symbol; and at least one processor configured to obtain information in relation to setting of at least one of the operation symbol or the auxiliary symbol, and cause the display to display the operation symbol and the auxiliary symbol so as to align the operation symbol and the auxiliary symbol in order of operations of the robot based on the obtained information in relation to setting.

18 Claims, 23 Drawing Sheets

1: L P[1] 100mm/sec FINE
2:   Weld Start[1,18.00Volts,200.0Amps]
3: L P[2] 60cm/min CNT100
4: L P[3] 60cm/min FINE
5:   Weld End[1,18.00Volts,200.0Amps,0.5s]

FIG. 11
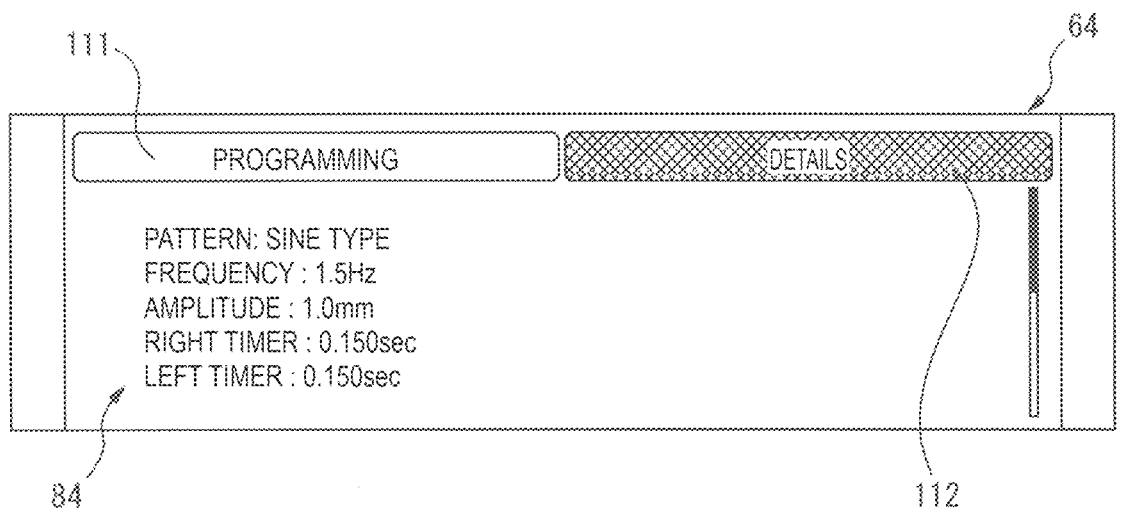
FIG. 12
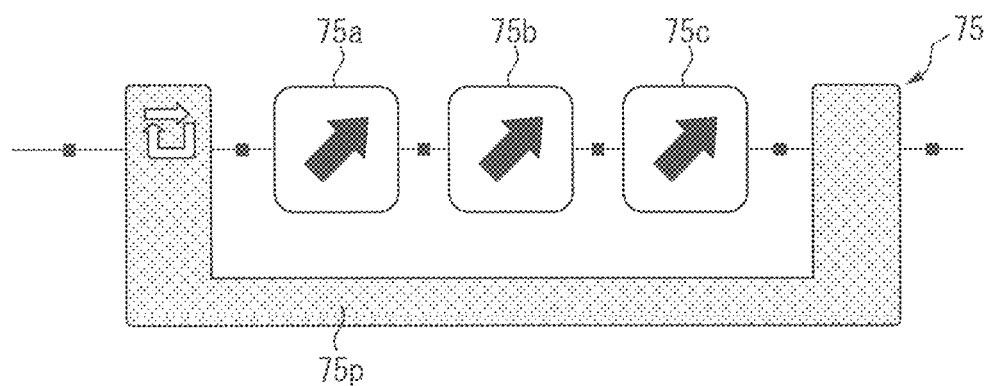
FIG. 13
```
1:  FOR R[1]=1 TO R[2]
2:  L P[2] 100mm/sec CNT100
3:  L P[3] 100mm/sec CNT100
4:  L P[1] 100mm/sec FINE
5:  ENDFOR
```

```
1:  IF (DI[1]=ON) THEN
2:  L P[1] 100mm/sec CNT100
3:  L P[2] 100mm/sec CNT100
4:  L P[3] 100mm/sec FINE
5:  ELSE
6:  L P[4] 100mm/sec CNT100
7:  L P[5] 100mm/sec CNT100
8:  L P[6] 100mm/sec FINE
9:  ENDIF
```

PROGRAM GENERATION DEVICE CONFIGURED TO GENERATE OPERATION PROGRAM INCLUDING OPERATION SYMBOL OF ROBOT APPARATUS

RELATED APPLICATIONS

The present application is a continuation application of U.S. patent application Ser. No. 17/096,971 filed on Nov. 13, 2020, which claims priority to Japanese Application Number 2019-222385, filed Dec. 9, 2019, the disclosure of which applications are hereby incorporated by reference herein in their entirety.

BACKGROUND OF THE INVENTION

1. Field of the Invention

The present invention relates to a program generation device configured to generate an operation program including an operation symbol of a robot apparatus.

2. Description of the Related Art

A robot apparatus including a robot and an operation tool is driven based on an operation program. The operation program can be generated in advance by an operator with the robot apparatus being in an offline state. Alternatively, an operator can set the robot at a desired position and a desired orientation by using a teach pendant. The operator can teach the position and the orientation of the robot as a teaching point. A robot controller can generate an operation program based on the teaching point.

In the operation program, a command for driving the robot or the operation tool can be written with a command statement. The operation program can be generated in a text format so as to include a plurality of command statements. Examples of the command statement of the robot apparatus include a command for moving a tool center point in a linear manner, a command for moving the tool center point in a curved manner, and a command for operating the operation tool.

In the related art, an operation program has been known in which operations of a robot and an operation tool are expressed by icons (e.g., JP 6498366 B, and US 2018/154,517 A1). In addition, an operation program including an icon indicating control of repeating an operation of a robot has been known (e.g., JP 2018-149206 A).

SUMMARY OF THE INVENTION

In a case where an operation program is generated by command statements, there is a problem that it is difficult for an operator to understand an overall process of the operation program because the operation program has a form in which the command statements including predetermined command characters are arranged. For example, in order that a robot apparatus performs one task, a plurality of command statements may be written. When arc welding is performed by a robot apparatus, a robot changes a position and an orientation while continuing to drive a welding torch. An operation program includes a command statement for indicating start of welding, a command statement for an operation of the robot, and a command statement for indicating end of the welding. In this case, there is a problem that it is difficult for the operator to know the range to which the command statements for performing the welding are applied.

By expressing the commands of the operation program with icons, the operator can visually know the operations of the robot apparatus. This facilitates work of generating and modifying the operation program. However, even in the operation program generated by the icons, when a command for starting the operation of the robot apparatus is displayed with one icon and a command for ending the operation is displayed with one icon, there is a problem that it is difficult to understand a section in which the operation is being performed.

Alternatively, in the robot apparatus, the operation of the robot apparatus may be changed according to predetermined conditions. In this case, when the operations of the robot apparatus according to the respective conditions are aligned in a plurality of rows or a plurality of columns, there is a problem that it becomes hard to see a screen. In this way, even when the commands of the operation program are expressed by the icons, it may take a long time to generate the operation program, and there is room for improvement of the program generation device.

A program generation device according to a first aspect of the present disclosure generates an operation program of a robot apparatus including a robot and an operation tool. The program generation device includes a display part configured to display information related to generation of a program, and an input part where an operator operates an image displayed on the display part. The display part displays the operation program. The operation program includes an operation symbol indicating an operation of the robot or the operation tool and an auxiliary symbol having a shape sandwiching the operation symbol or a shape surrounding the operation symbol in such a manner that at least one operation symbol is specified. The auxiliary symbol indicates control of adding an operation of the robot apparatus or control of correcting an operation of the robot apparatus defined by the operation symbol. The display part is configured to display a screen configured to set setting information related to control or an operation of the robot apparatus by selecting the operation symbol or the auxiliary symbol by the operator, and is formed in such a manner that the operator is enabled to set the setting information. The display part displays the operation symbol and the auxiliary symbol so as to align the operation symbol and the auxiliary symbol in order of operations of the robot apparatus.

A program generation device according to a second aspect of the present disclosure generates an operation program of a robot apparatus including a robot and an operation tool. The program generation device includes a display part configured to display information related to generation of a program, and an input part where an operator operates an image displayed on the display part. The display part displays the operation program. The operation program includes an operation symbol indicating an operation of the robot or the operation tool and an auxiliary symbol having a shape sandwiching the operation symbol or a shape surrounding the operation symbol in such a manner that at least one operation symbol is specified. The auxiliary symbol indicates predetermined control with respect to the operation by the operation symbol. The display part is configured to display a screen configured to set setting information related to control or an operation of the robot apparatus by selecting the operation symbol or the auxiliary symbol by the operator in such a manner that the operator is enabled to set the setting information. The display part displays all of the operation symbol and the auxiliary symbol so as to align all of the operation symbol and the auxiliary symbol in one row or one column in order of operations of the robot apparatus.

BRIEF DESCRIPTION OF THE DRAWINGS

FIG. 11 is a screen configured to set conditions of an auxiliary icon for performing weaving.

FIG. 12 is an operation program including an auxiliary icon for repeating an operation of the robot.

FIG. 13 is an operation program in a text format of control of repeating an operation of the robot.

DETAILED DESCRIPTION

A program generation device configured to generate an operation program of a robot apparatus according to an embodiment will be described with reference to FIG. 1 to FIG. 30.

Figure 1:
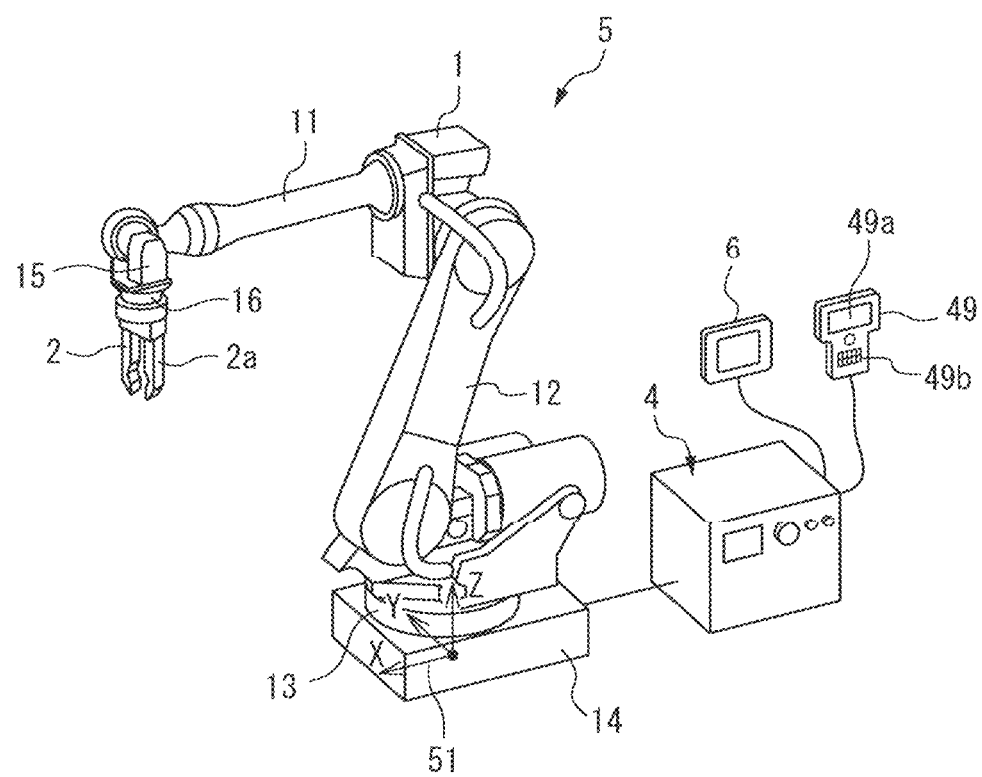
FIG. 1 is a perspective view of a robot apparatus provided with a hand.

FIG. 1 is a schematic view of a robot apparatus in the present embodiment. A robot apparatus 5 includes a hand 2 as an operation tool (end effector) and a robot 1 that moves the hand 2. The robot 1 of the present embodiment is an articulated robot having a plurality of joints.

The robot 1 includes a base 14 and a rotation base 13 that is supported by the base 14. The base 14 is fixed on an installation surface. The rotation base 13 is formed so as to rotate with respect to the base 14. The robot 1 includes an upper arm 11 and a lower arm 12. The lower arm 12 is rotatably supported by the rotation base 13 via the joint. The upper arm 11 is rotatably supported by the lower arm 12 via the joint. Additionally, the upper arm 11 rotates about a rotation axis parallel to an extending direction of the upper arm 11.

The robot 1 includes a wrist 15 that is coupled to an end portion of the upper arm 11. The wrist 15 is rotatably supported by the upper arm 11 via the joint. The wrist 15 includes a flange 16 that is formed so as to be rotatable. The hand 2 is fixed to the flange 16 of the wrist 15. The robot 1 of the present embodiment includes six drive axes, but the embodiment is not limited to this. Any robot that can move the operation tool can be employed.

The hand 2 is the operation tool that grips and releases a workpiece. The hand 2 has claw parts 2a that face each other. The workpiece is gripped by closing the claw parts 2a. The operation tool is not limited to the hand that grips the workpiece. Any operation tool can be attached to a robot in response to a task that is performed by a robot apparatus. For example, when the robot apparatus performs arc welding, a welding torch can be attached to the robot. Alternatively, when adhesive is applied, the operation tool for applying the adhesive can be attached to the robot.

Figure 2:
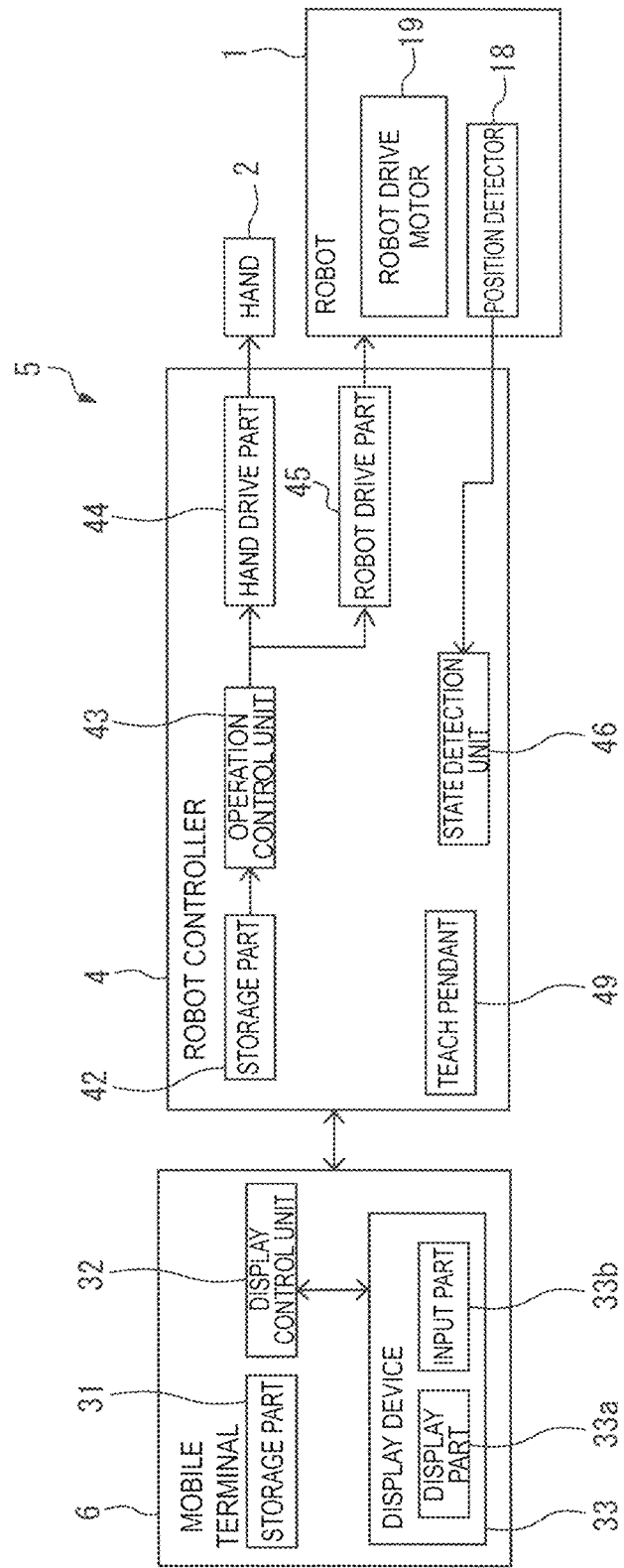
FIG. 2 is a block diagram of the robot apparatus provided with the hand.

FIG. 2 is a block diagram illustrating the robot apparatus of the present embodiment. Referring to FIG. 1 and FIG. 2, the robot 1 includes a robot drive device that changes a position and an orientation of the robot 1. The robot drive device includes a robot drive motor 19 that drives constituent members such as an arm, a wrist and the like. By driving the robot drive motor 19, directions of the respective constituent members change. The hand 2 includes a hand drive device that drives the hand 2. The hand drive device includes a valve or the like connected to a pressure pump for driving the claw parts 2a of the hand 2.

The robot apparatus 5 includes a robot controller 4. The robot controller 4 includes an arithmetic processing device (computer) including a central processing unit (CPU) as a processor. The robot apparatus 5 conveys a workpiece based on an operation program.

The arithmetic processing device in the robot controller 4 includes a storage part 42 for storing predetermined information. The storage part 42 stores information related to control of the robot 1 and the hand 2. The operation program is stored in the storage part 42. The storage part 42 can be configured of a storage medium capable of storing information, for example, a volatile memory, a non-volatile memory, a hard disk, or the like.

The arithmetic processing device of the robot controller 4 includes an operation control unit 43 that sends an operation command. The operation control unit 43 corresponds to a processor that is driven in accordance with the operation program. The operation control unit 43 is formed so as to be able to read information stored in the storage part 42. The processor reads the operation program and functions as the operation control unit 43 by performing control that is defined in the operation program.

The operation control unit 43 sends the operation command for driving the robot 1 based on the operation program to a robot drive part 45. The robot drive part 45 includes an electric circuit for driving the robot drive motor 19. The robot drive part 45 supplies electricity to the robot drive motor 19 based on the operation command. Further, the operation control unit 43 sends an operation command for driving the hand 2 based on the operation program to a hand drive part 44. The hand drive part 44 includes an electric circuit that drives the hand drive device. The hand drive part 44 supplies electricity based on the operation command to the hand drive device.

The robot controller 4 includes a teach pendant 49 for manually driving the robot 1. The teach pendant 49 includes a display part 49a that displays information related to control of the robot apparatus 5, and an input part 49b configured of an input device such as a keyboard, a dial and the like. The display part 49a can be configured of a display panel such as a liquid crystal display panel. An operator can manually adjust a position and an orientation of the robot 1 by operating the input part 49b.

The robot 1 includes a position detector 18 as a state detector for detecting the position and the orientation of the robot 1. The position detector 18 of the present embodiment is attached to the robot drive motor 19 corresponding to a drive axis of a constituent element such as an arm. For example, the position detector 18 is formed so as to detect a rotation angle when the robot drive motor 19 is driven.

The robot controller 4 includes a state detection unit 46 that detects the position and the orientation of the robot 1, based on an output from the position detector 18. The state detection unit 46 corresponds to a processor that is driven in accordance with the operation program. The processor reads the operation program and functions as the state detection unit 46 by performing the control defined in the operation program.

A world coordinate system 51 is set in the robot apparatus 5 of the present embodiment. In the example illustrated in FIG. 1, an origin of the world coordinate system 51 is arranged in the base 14 of the robot 1. The world coordinate system 51 is also referred to as a reference coordinate system of the robot 1. The world coordinate system 51 is a coordinate system in which a position of the origin is fixed, and further, directions of coordinate axes are fixed. Additionally, in the robot apparatus 5, a tool coordinate system that has an origin set at any position of the operation tool is set. The origin of the tool coordinate system according to the present embodiment is set at a tool center point. When the position and the orientation of the robot 1 change, the position of the origin of the tool coordinate system and a direction of the tool coordinate system change. For example, the position of the robot 1 corresponds to a position of the tool center point (the position of the origin of the tool coordinate system).

Furthermore, the orientation of the robot 1 corresponds to the direction of the tool coordinate system with respect to the world coordinate system 51.

The robot apparatus 5 includes a mobile terminal 6 as a program generation device that generates the operation program of the robot apparatus 5. The mobile terminal 6 of the present embodiment is a tablet terminal. The mobile terminal 6 is connected to the robot controller 4 via a communication device. The mobile terminal 6 includes an arithmetic processing device having a CPU as a processor. The arithmetic processing device includes a random access memory (RAM), a read-only memory (ROM), and the like that are connected to the CPU via a bus. The mobile terminal 6 includes a storage part 31 that stores information related to the generation of the operation program. The storage part 31 can be configured of a storage medium capable of storing information, for example, a volatile memory, a non-volatile memory, a hard disk, or the like.

The mobile terminal 6 according to the present embodiment includes a display device 33 having a display panel of a touch panel type. Any type such as a resistive film type, a capacitance type, or a surface acoustic wave type can be used as the display panel of the touch panel type. The display device 33 includes a display part 33a that displays information related to the generation of the operation program, and an input part 33b that allows the operator to manipulate an image displayed on the display part 33a or to input information. In the present embodiment, the display device 33 functions as the display part 33a and the input part 33b.

The arithmetic processing device in the mobile terminal 6 includes a display control unit 32 configured to control an image that is displayed on the display part 33a. The display control unit 32 has functions of detecting an operation to the input part 33b by the operator and controlling an image that is displayed on the display part 33a. The display control unit 32 corresponds to a processor that is driven in accordance with a predetermined rule. The processor functions as the display control unit 32 by controlling the image that is displayed on the display part 33a in response to the operation to the input part 33b.

The program generation device is not limited to the mobile terminal 6, and any device including an arithmetic processing device can be employed. A personal computer that is not connected to the robot controller can be used as the program generation device, for example. In this case, the input part can be configured with an input device such as a keyboard, a mouse and the like. A display part can be configured of a display panel such as a liquid crystal display panel. Alternatively, the teach pendant 49 may function as the program generation device. In this case, the display part 49a of the teach pendant 49 functions as the display part of the program generation device, and the input part 49b of the teach pendant 49 functions as the input part of the program generation device.

Figure 3:
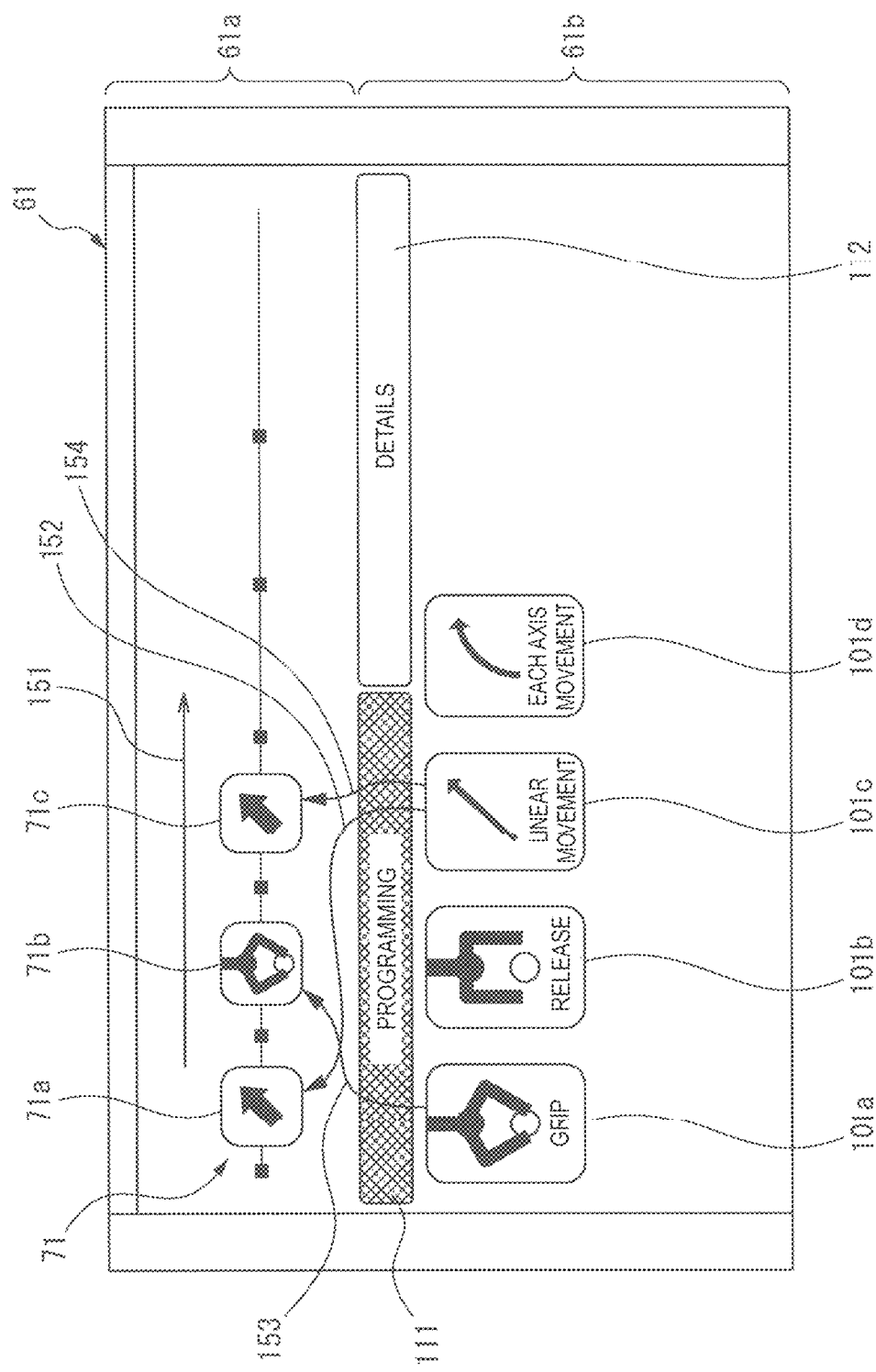
FIG. 3 is an image displayed on a mobile terminal of the robot apparatus provided with the hand.

FIG. 3 illustrates an image displayed on the display part of the mobile terminal according to the present embodiment. First, a basic method for generating the operation program according to the present embodiment will be described. A screen of the display part 33a of the mobile terminal 6 in the present embodiment is divided into a program display region 61a for displaying an operation program 71 and an information display region 61b for displaying detailed information related to the generation of the operation program 71. In the program display region 61a and the information display region 61b, in a case where all the information cannot be displayed, a scroll bar is displayed. The operator can view all the information by moving the scroll bar. For example, the operation program 71 may be long, and all the operation program 71 may not be displayed on the screen of the display part 33*a*. In this case, the scroll bar that moves the operation program 71 in a horizontal direction is displayed. The operator can view a desired part of the operation program 71 by moving the scroll bar.

The operation program 71 in the present embodiment includes operation icons 71*a* to 71*c* as operation symbols indicating operations of the robot 1 or the hand 2. The operation icons 71*a* to 71*c* indicate commands for operating the robot 1 or the hand 2. The operation control unit 43 drives the robot 1 and the hand 2 based on the operation icons 71*a* to 71*c* displayed in the program display region 61*a*. The operation control unit 43 performs the operations specified by the operation icons 71*a* to 71*c* from the operation icon 71*a* on a left side of an image 61 toward a right side, as indicated by an arrow 151. The operator can set the operations of the robot apparatus 5 in time series in the program display region 61*a*.

The operation icons 71*a* and 71*c* indicate an operation in which the position (tool center point) of the robot 1 moves in a linear manner. The operation icon 71*b* indicates an operation in which the hand 2 grips a workpiece. In this example, the robot apparatus 5 grips the workpiece by closing the claw parts 2*a* of the hand 2 by the operation icon 71*b* after the position of the robot 1 moves in the linear manner by the operation icon 71*a*. Thereafter, the position of the robot 1 moves in the linear manner by the motion icon 71*c*.

In the information display region 61*b*, a tab 111 for programming and a tab 112 for details for setting the operations of the operation icons 71*a* to 71*c* in details are arranged. The operator can select the tab 111 by pressing the tab 111 for programming with a finger. The display control unit 32 displays reference operation icons 101*a* to 101*d* which are references for generating the operation icons 71*a* to 71*c*, in the information display region 61*b*. The reference operation icons 101*a* to 101*d* indicate basic operations that the robot apparatus 5 drives. A condition of an operation such as a setting value is not set in the reference operation icons 101*a* to 101*d*.

The reference operation icon 101*a* indicates an operation in which the hand 2 grips a workpiece. The reference operation icon 101*b* indicates an operation in which the hand 2 releases the workpiece. The reference operation icon 101*c* indicates the operation of the robot 1 in which the position of the robot 1 moves in the linear manner. The reference operation icon 101*d* indicates an operation of the robot 1 in which the robot drive motor 19 of each drive axis of the robot 1 is driven and the position of the robot 1 moves in a non-linear manner.

The operator can set the basic operation of the robot apparatus 5 at the beginning. For example, the operator can generate the operation icon 71*a* by moving the reference operation icon 101*c* to the program display region 61*a* as indicated by an arrow 152 while pressing the reference operation icon 101*c* with the finger. Similarly to this operation, the operator can generate the operation icon 71*b* by moving the finger as indicated by an arrow 153 while pressing the reference operation icon 101*a*. The operator can generate the operation icon 71*c* by moving the finger as illustrated by an arrow 154 while pressing the reference operation icon 101*c*.

Figure 4:
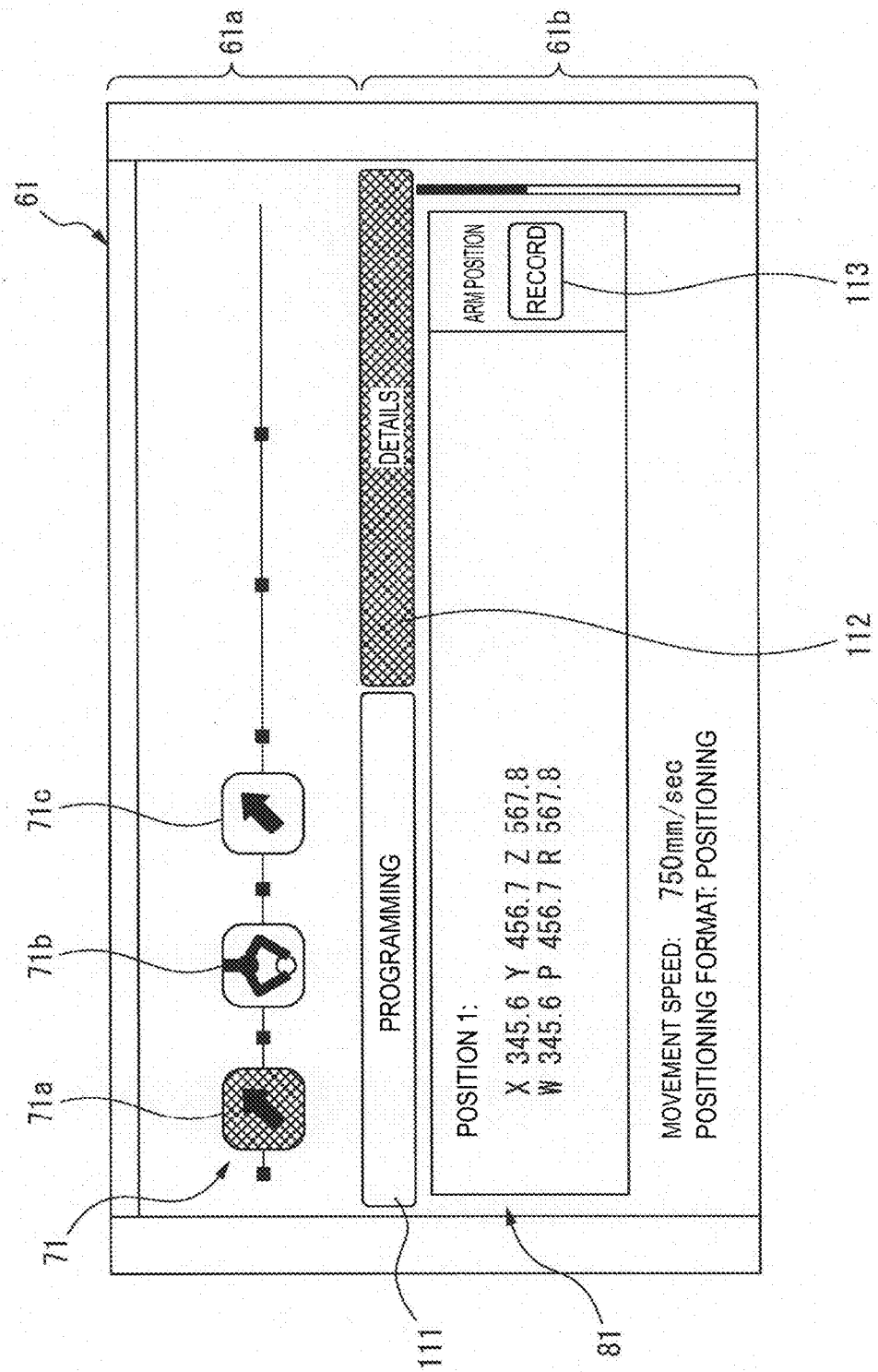
FIG. 4 is another image displayed on the mobile terminal of the robot apparatus provided with the hand.

FIG. 4 illustrates an image in which a setting screen for an operation icon is displayed. Next, the operator sets setting information for performing an operation of the robot apparatus 5 in the respective operation icons 71*a* to 71*c*. The setting information includes conditions for performing each operation.

In the example illustrated in FIG. 4, the operator has selected the operation icon 71*a* by pressing the operation icon 71*a*. A color of the operation icon 71*a* changes. The display control unit 32 automatically selects the tab 112 for details in the information display region 61*b*. The display control unit 32 displays a setting screen configured to set setting values related to the operation of the operation icon 71*a* in the information display region 61*b*. Setting information 81 including conditions such as setting values of the robot 1 in the operation icon 71*a* is displayed on the setting screen. In the example illustrated in FIG. 4, a position and an orientation of the robot 1 which are a first target position are illustrated in order to perform the operation of the operation icon 71*a*. In the example here, the position and the orientation of the robot 1 are set by using the world coordinate system 51.

Further, the setting information 81 includes a movement speed for moving the position of the robot 1. Further, the setting information 81 includes a positioning format in order to determine whether or not the position of the robot 1 accurately reaches the target position. In the example here, the position of the robot 1 is set so as to accurately reach the target position. In this manner, the conditions under which the robot 1 moves in the linear manner are displayed on the setting screen.

The operator can operate the input part 33*b* and set or modify the setting information 81. For example, the operator presses a region where the target position is displayed with the finger, and the display part 33*a* displays an image for changing the target position. The operator can manually input a coordinate value on an X-axis, a coordinate value on a Y-axis, and a coordinate value on a Z-axis of the target position and the like. Alternatively, the operator can operate the teach pendant 49 and change the position and the orientation of the robot 1. When the position and the orientation of the robot 1 are at the desired position in the desired orientation, the operator presses a button 113 displayed on a side of the target position. By adopting this operation, the state detection unit 46 of the robot controller 4 detects the position and the orientation of the robot 1. Then, the display control unit 32 can acquire the position and the orientation of the robot 1 from the state detection unit 46 and set the position and the orientation to the target position of the setting information 81.

The operator can set setting information related to the operation of the robot 1 or the hand 2 by a similar operation also in the operation icons 71*b* and 71*c*. In this manner, the operator can generate the operation program 71 by repeating generating the operation icons 71*a* to 71*c* and setting the setting information in the operation icons 71*a* to 71*c*.

By representing the operation program 71 by using the operation icons 71*a* to 71*c*, the operator can visually know the operation of the robot apparatus 5. It becomes easier for the operator to perform the work of generating and modifying the operation program 71.

Figure 5:
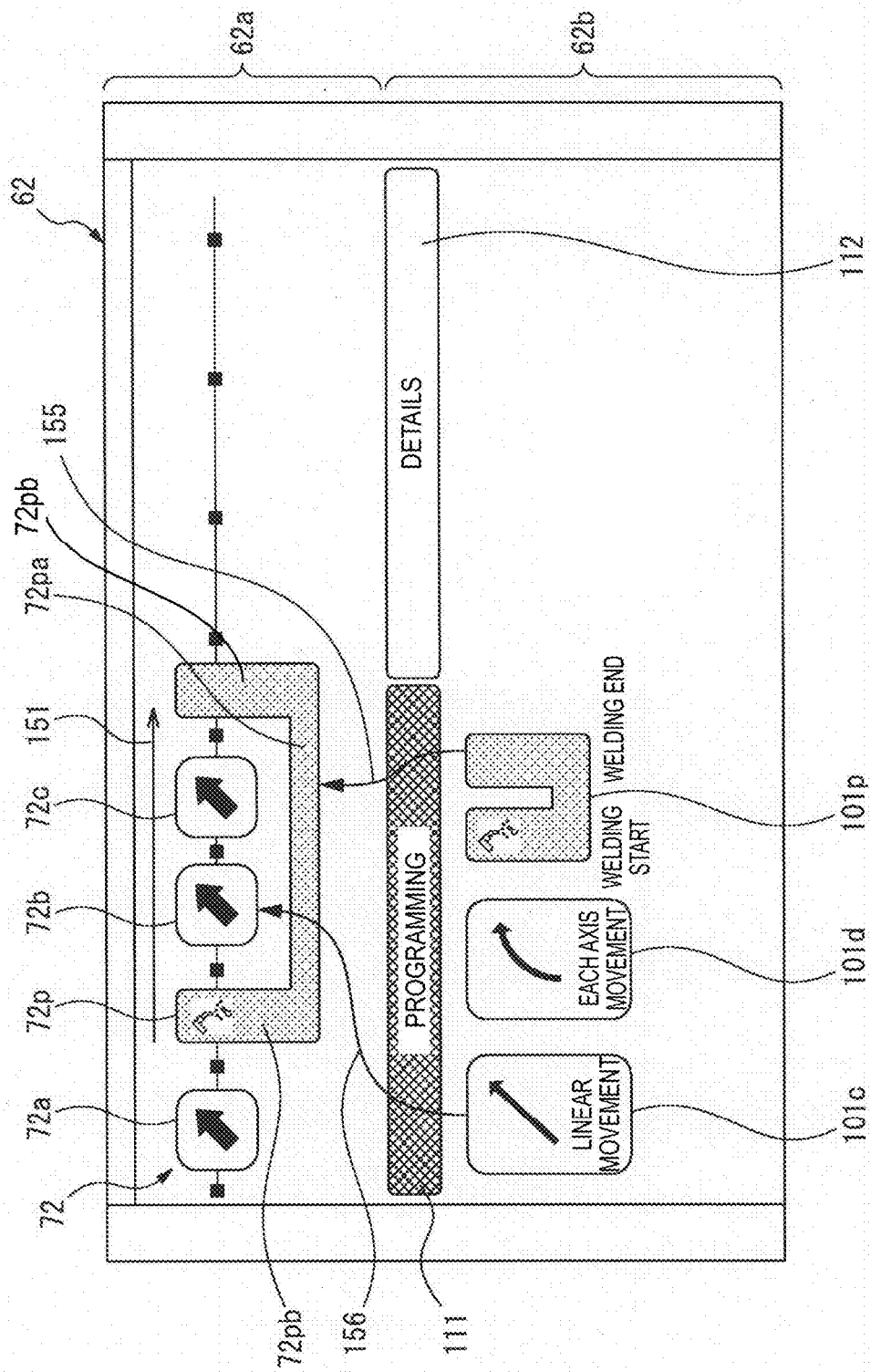
FIG. 5 is an image displayed on a mobile terminal of a robot apparatus provided with a welding torch.

FIG. 5 illustrates an image displayed on the mobile terminal of the robot apparatus that performs arc welding. A welding torch for performing the arc welding is attached to the robot 1 as the operation tool. An operation program 72 of the robot apparatus is displayed in a program display region 62*a* of an image 62.

The operation program 72 includes an auxiliary icon 72*p* as an auxiliary symbol that specifies at least one operation symbol in addition to operation icons 72*a* to 72*c* as an operation symbol. The auxiliary icon has a shape that specifies at least one operation icon. The auxiliary icon in this embodiment has a first line 72*pa* extending in a direction, indicated by the arrow 151, in which the operation icons are aligned, and second lines 72*pb* extending between the operation icons from the first line 72*pa*. The auxiliary icon according to the present embodiment is formed in a U-shape so as to sandwich the operation icons and other auxiliary icons. Note that the auxiliary symbol may have a shape surrounding at least one operation icon.

The auxiliary symbol according to the present embodiment indicates predetermined control to the operation by the operation symbol, control of adding the operation of the robot apparatus, or control of correcting the operation of the robot apparatus determined by the operation symbol. In the example illustrated in FIG. 5, the auxiliary icon 72*p* indicates control of adding a task of welding by a welding torch as the control of adding the operation of the robot apparatus. A diagram of a type of an operation or a type of control is arranged in the auxiliary icon according to the present embodiment. For example, a diagram of welding is arranged on the upper left of the auxiliary icon 72*p*. A type of an operation or a type of control may be written in characters in the auxiliary icon. Additionally, the auxiliary icon 72*p* indicates the start of welding and the end of welding by the lines 72*pb*.

Figure 6:
FIG. 6 is an operation program in a text format when welding is performed by the robot apparatus.

FIG. 6 illustrates an operation program in which the operation program illustrated in FIG. 5 is written in a text format. In an operation program 92, L in a command statement in a first row indicates that the position of the robot 1 moves in the linear manner. P[1] indicates moving toward a first target position. Furthermore, it is indicated that the robot 1 moves at a speed of 100 mm/sec. FINE indicates a method (positioning) in which the robot moves with high precision toward the target position.

In a command statement in a second row, it is indicated that the welding torch starts welding. In the example here, it is indicated that the welding is started according to first data of welding, and the welding is started at a voltage of 18 volts with a current of 200 amperes. In the data of welding, a plurality of conditions of welding when arc welding is performed are collectively stored. For example, the data of welding includes conditions at the start of the arc welding or at the end of the arc welding. By specifying a welding data number, the conditions when the arc welding is performed can be collectively obtained from the storage part 42.

In the operation program 92, the position of the robot 1 moves in the linear manner in accordance with command statements in a third row and a fourth row during a period of the welding. The command statements in the third row and the fourth row indicate that the position of the robot 1 moves in the linear manner toward a target position P[2] or P[3]. CNT100 in the command statement in the third row indicates that the position of the robot 1 passes such that a movement path toward P[2] becomes smooth.

In a command statement in a fifth row, it is indicated that the welding torch ends the welding. In the example here, the welding is ended in accordance with the first welding data. Furthermore, at the end of the welding, processing for suppressing generation of a crater hole due to a sudden drop in voltage is performed. In the command statement in the fifth row, it is indicated that a voltage is 18 volts, a current is 200 amperes, and a processing time is 0.5 seconds, as conditions for performing the processing for the crater.

With reference to FIG. 5 and FIG. 6, the operation icon 72*a* corresponds to the command statement in the first row of the operation program 92 in a text format. The operation icon 72*b* corresponds to the command statement in the third row of the operation program 92. The operation icon 72*c* corresponds to the command statement in the fourth row of the operation program 92. The command statements in the second row and the fifth row related to the welding in the operation program 92 correspond to the auxiliary icon 72*p*. The time period during which the welding is performed is specified by the auxiliary icon 72*p*. The two lines 72*pb* of the auxiliary icon 72*p* indicate the start of the welding and the end of the welding.

In the image 62 illustrated in FIG. 5, the tab 111 for programming is selected. The reference operation icons 101*c* and 101*d* are displayed in the information display region 62*b*. The reference auxiliary icon 101*p* is also displayed. The operator can move the finger as indicated by an arrow 155 while pressing the reference auxiliary icon 101*p* with the finger, thereby generating the auxiliary icon 72*p* in the program display region 62*a*. After this, the operator can arrange the operation icon 72*b* in a region that is sandwiched by the auxiliary icon 72*p* by moving the finger as indicated by an arrow 156 while pressing the reference operation icon 101*c* with the finger. The operator can set basic operations of the operation program 72.

Figure 7:
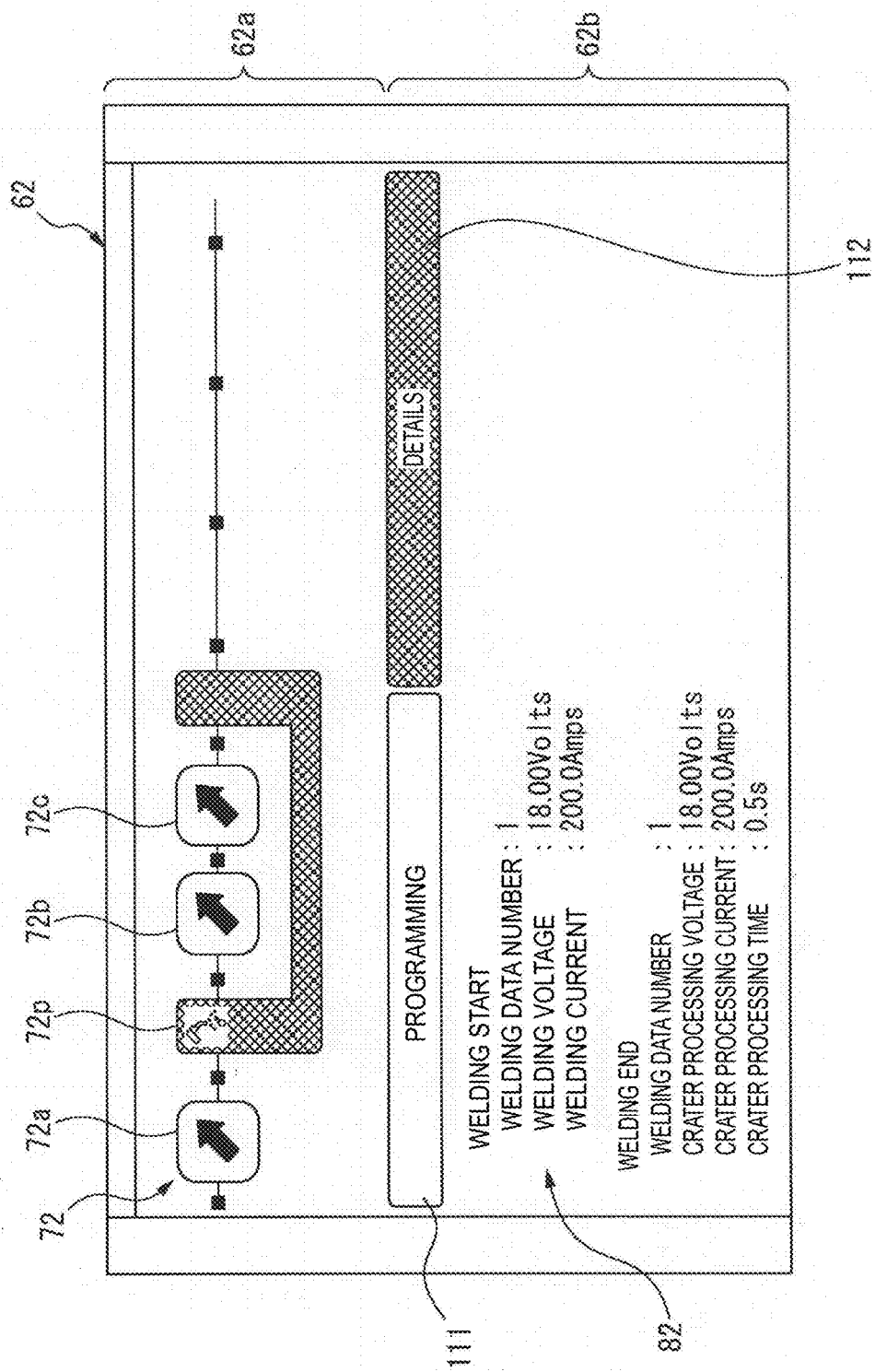
FIG. 7 is another image displayed on the mobile terminal of the robot apparatus provided with the welding torch.

FIG. 7 illustrates a screen configured to set setting information of an auxiliary icon for performing welding. Similarly to setting the operation icons, the operator sets conditions of an operation of the robot apparatus on a setting screen for an auxiliary symbol. The operator selects the auxiliary icon 72*p* in the display part 33*a*, thereby changing a color of the auxiliary icon 72*p*. In addition, the display control unit 32 automatically selects the tab 112 for details in the information display region 62*b*, and displays the setting screen. The display control unit 32 displays setting information 82 related to welding in the information display region 62*b*. The operator can operate the input part 33*b* and set the setting information 82 such as conditions for starting the welding, conditions for ending the welding and the like. In the setting information 82, conditions similar to those included in the operation program 92 such as a welding data number, a voltage, a current, and a processing time of a crater can be set. In the present embodiment, the operation of the operation tool is added by the auxiliary symbol, but the embodiment is not limited to this. By using the auxiliary symbol, an operation of the robot may be added.

As described above, the program generation device according to the present embodiment can generate an operation program while imparting the auxiliary symbol to the operation symbols. By employing the auxiliary symbol according to the present embodiment, the operator can visually understand control or an operation of the robot apparatus defined by the auxiliary symbol. In particular, the operator can easily understand a section in which a specific task is performed by the robot apparatus. As a result, efficiency of the work of generating the operation program is improved.

The auxiliary icon 72*p* indicates control of adding the operation of the robot apparatus. By employing the auxiliary icon indicating the control of adding the operation of the robot apparatus, a plurality of operations of the robot apparatus can be separated and set. For example, an operation performed by the operation tool and change of the position and the orientation of the robot can be separated and set. Further, the auxiliary icon can be added to the operation program in which the operation of the robot apparatus is set. For this reason, the operation program is easily generated, and the efficiency of the work of generating the operation program is improved. The operation added by the auxiliary icon is not limited to the operation of the operation tool, and an operation of any device included in the robot apparatus can be employed. For example, when the robot apparatus includes an auxiliary device such as a positioner that rotates a workpiece, an auxiliary icon indicating an operation of the auxiliary device can be employed.

Figure 8:
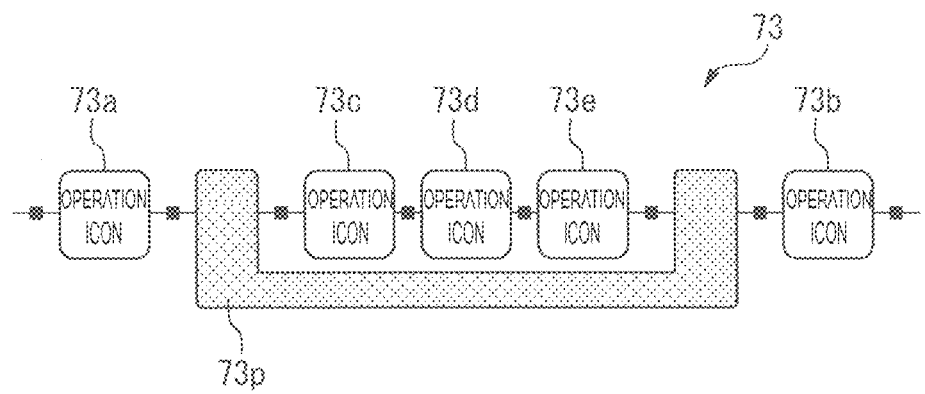
FIG. 8 is an operation program for describing an auxiliary icon according to an embodiment.

FIG. 8 illustrates an operation program for describing an auxiliary symbol. In an operation program 73, an auxiliary icon 73p is set for a plurality of operation icons 73c to 73e. All of the operation icons 73a to 73e and the auxiliary icon 73p are aligned and displayed in one row in order of operations of the robot apparatus. In the present embodiment, the row in which the operation icons 73a to 73e and the auxiliary icon 73p are aligned extends in a horizontal direction of a screen of the display part 33a. In other words, the operation icons 73a and 73b and the auxiliary icon 73p are aligned and displayed in the horizontal direction of the display part 33a without being aligned and displayed in a vertical direction of the display part 33a. Also in an inside of the auxiliary icon 73p, the operation icons 73c to 73e are aligned and displayed in a direction of the row.

In this way, all operation icons and auxiliary icons can be aligned and displayed in one row. By applying the control of the display, the operator can know the operations of the robot apparatus in time series by moving the image of the operation program in an extending direction of the row. In addition, a state in which the operation program becomes long in a direction perpendicular to the direction of the row and the operation program and the information display region are simultaneously invisible can be avoided. The operator can simultaneously view the operation program and the information display region, thereby improving the efficiency of the work of generating the operation program.

Figure 9:
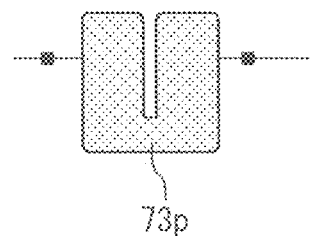
FIG. 9 is an image when the auxiliary icon illustrated in FIG. 8 is closed.

FIG. 9 illustrates the operation program when the auxiliary icon is closed. The auxiliary icon 73p can be closed by an operation by the operator. For example, the operator can press the auxiliary icon 73p consecutively twice, thereby causing the auxiliary icon 73p to be in a closed state. The operator can also return the closed auxiliary icon 73p to the original state as illustrated in FIG. 8 by pressing the closed auxiliary icon 73p consecutively twice.

When the auxiliary icon 73p sandwiches many operation icons 73c to 73e, the auxiliary icon 73p extends long in the horizontal direction of the display part 33a. In this case, the plurality of operations of the robot apparatus can be compact by closing the auxiliary icon. By closing the auxiliary icon, the operation icons in a section specified by the auxiliary icon can be displayed as one auxiliary icon. The operation program can be simply expressed. Also, the operator can easily confirm operations before and after the operations of the robot apparatus 5 specified by the auxiliary icon.

Figure 10:
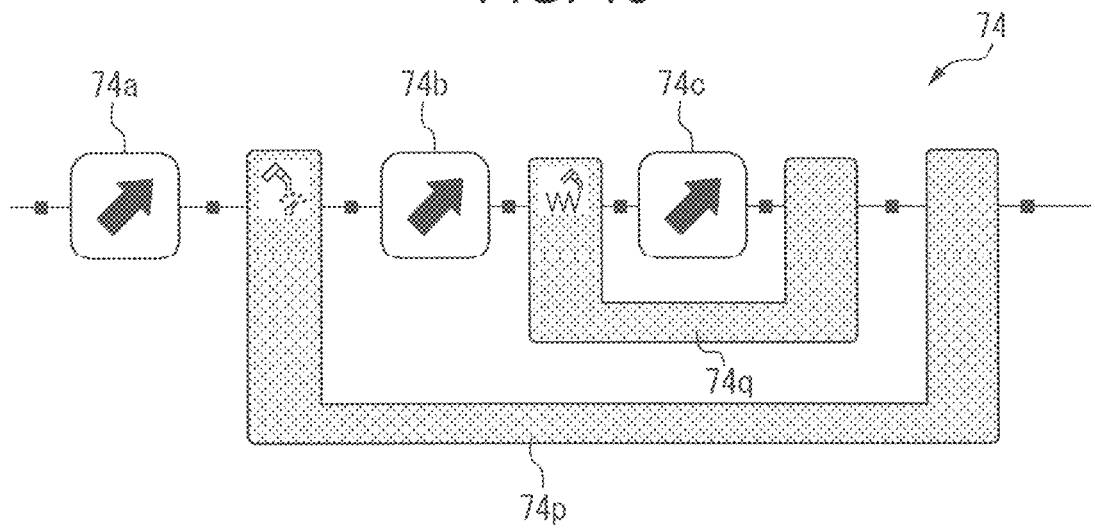
FIG. 10 is an operation program for performing welding while performing weaving.

FIG. 10 illustrates another operation program for performing welding by the robot apparatus of the present embodiment. In an operation program 74, weaving is performed in a part of a time period during a period of welding. The weaving is a welding method that reciprocates a welding torch in a direction intersecting a movement path in a time period during which the welding torch travels along the movement path. The weaving is suitable, for example, in a case of forming a large bead. An auxiliary icon 74q which indicates the weaving sandwiches an operation icon 74c. In addition, the auxiliary icon 74p that indicates the welding sandwiches an operation icon 74b and the auxiliary icon 74q. In the operation program 74, a plurality of auxiliary icons 74p and 74q and operation icons 74a to 74c are aligned and displayed in one row.

FIG. 11 illustrates a setting screen for the auxiliary icon for controlling the start and the end of the weaving. In an image 64, the auxiliary icon 74q for performing the weaving is selected, and the tab 112 for details is selected. Setting information 84 is displayed in an information display region of the image 64.

The setting information 84 includes conditions including setting values for performing the weaving. In the example here, a sine type is set as a pattern in which the welding torch moves with respect to a travel direction. In addition, a frequency at which the welding torch vibrates, and an amplitude that is a distance from a weld line to an end of a vibration when the weaving is performed are set. Additionally, a right timer indicates a stopping time of the welding torch at a right end when the weaving is performed. A left timer indicates a stopping time of the welding torch at a left end when the weaving is performed.

Referring to FIG. 10, in the operation program 74, after the position of the robot 1 is changed by the operation icon 74a, the welding is started by the auxiliary icon 74p. Then, while the welding is being performed, the position of the robot 1 is moved in the linear manner by the operation icon 74b. After this, the weaving is started by the auxiliary icon 74q indicating the start and the end of the weaving. Then, the position of the robot 1 is moved to a position specified by the operation icon 74c while the weaving is being performed. The weaving is ended when the position of the robot 1 is moved to the position specified by the operation icon 74c. Additionally, the welding is ended by the auxiliary icon 74p.

In this way, another auxiliary symbol can be inserted in an inside of an auxiliary symbol. In other words, in an operation program that includes a plurality of auxiliary symbols, a first auxiliary symbol can specify at least one operation symbol, and a second auxiliary symbol can specify the first auxiliary symbol. Also, an operator can set a condition of an operation for the first auxiliary symbol sandwiched by the second auxiliary symbol. By employing this configuration, the plurality of auxiliary symbols can be combined in order to perform control. During a period of one type of control being performed, another type of control can be performed or another operation can be added.

Next, an auxiliary symbol indicating control with respect to an operation by an operation symbol will be described. In this control, without changing the operation by the operation symbol, for example, the operation by the operation symbol is repeated, or the operation is selected according to a predetermined condition. FIG. 12 illustrates an operation program that includes an auxiliary symbol indicating control of repeating an operation of the robot apparatus. FIG. 13 illustrates an operation program in which the operation program illustrated in FIG. 12 is written in a text format. With reference to FIG. 12 and FIG. 13, in operation programs 75 and 95, three types of linear movement are repeated until a variable R[1] changes from 1 to R[2].

The operation program 75 includes operation icons 75a to 75c and an auxiliary icon 75p. Each of the operation icons 75a to 75c is an operation symbol that indicates movement in the linear manner. The auxiliary icon 75p is an auxiliary symbol indicating control of repeating a predetermined operation of the robot apparatus. Command statements in a first row and a fifth row in the operation program 95 correspond to the auxiliary icon 75p. Command statements from a second row to a fourth row in the operation program 95 correspond to the operation icons 75a to 75c.

Figure 14:
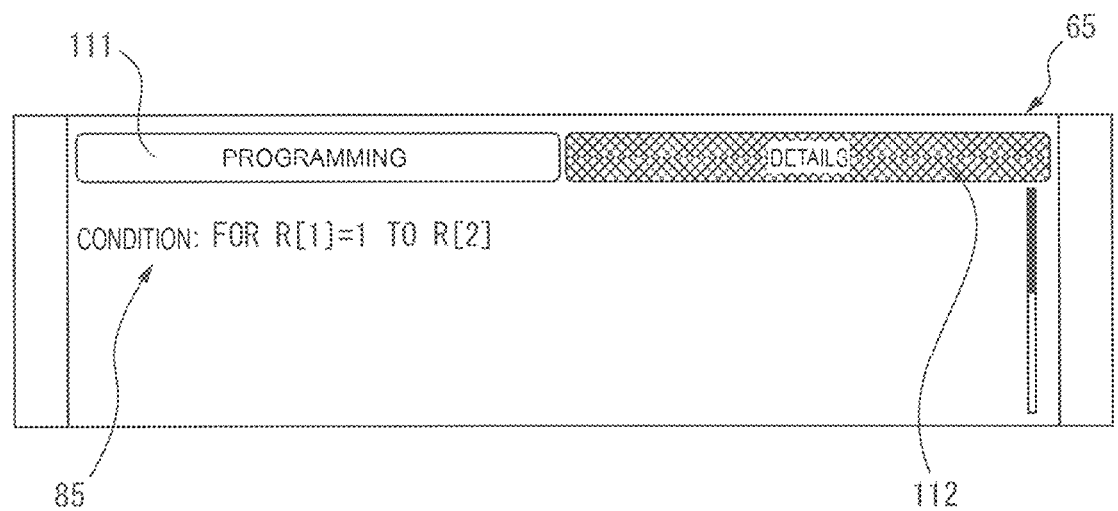
FIG. 14 is a screen configured to set a condition of an auxiliary icon for repeating an operation of the robot.

FIG. 14 illustrates a setting screen for an auxiliary icon for repeating an operation of the robot apparatus. In an image 65, the auxiliary icon 75p is selected and the tab 112 for details is selected. An information display region is displayed with setting information 85 including a condition for repeating the operation of the robot apparatus. The operator can set the setting information 85 on the setting screen.

In this way, by employing the auxiliary icon 75*p*, the operation of the robot apparatus can be repeated according to a predetermined condition. On the setting screen for the auxiliary icon 75*p*, the condition for repeating the operation can be set.

Figure 15:
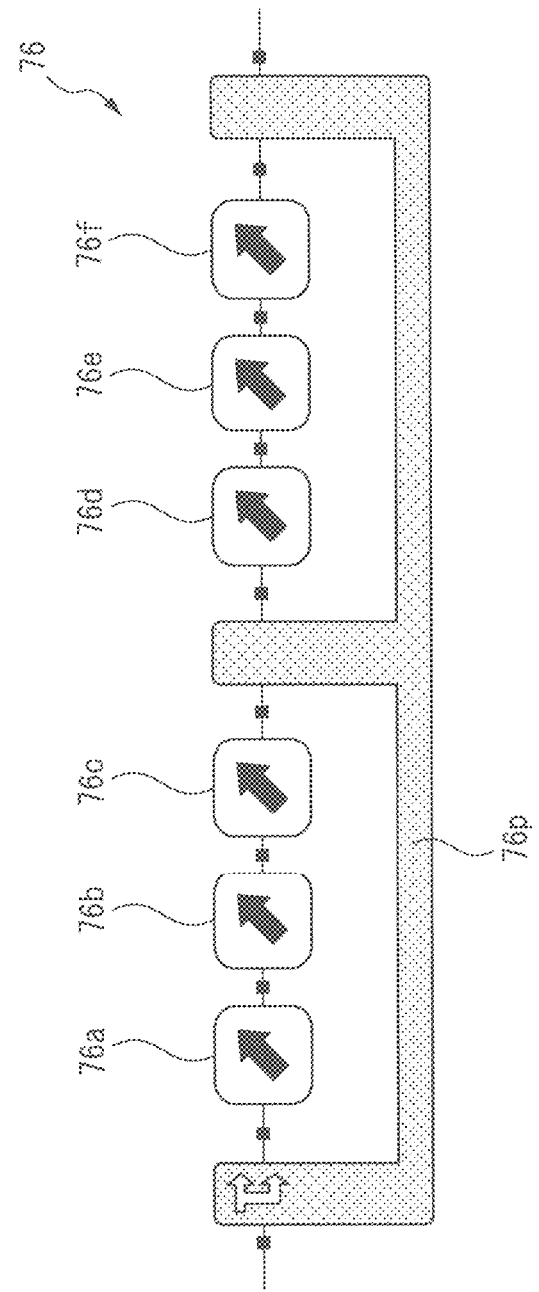
FIG. 15 is an operation program including an auxiliary icon for changing an operation of the robot according to a predetermined condition.
Figures 16, 17:
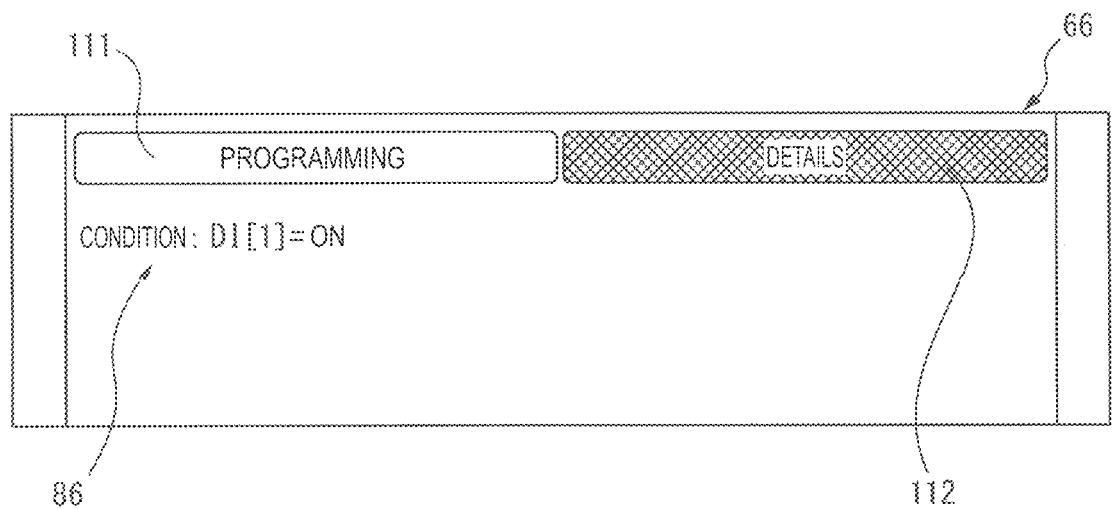
FIG. 16 is an operation program in a text format of control of changing an operation of the robot according to a predetermined condition.
FIG. 17 is a screen configured to set a condition of an auxiliary icon for changing an operation of the robot according to a predetermined condition.

FIG. 15 illustrates an operation program for selecting an operation of the robot apparatus according to the predetermined condition. FIG. 16 illustrates an operation program in which the operation program illustrated in FIG. 15 is written in a text format. Referring to FIG. 15 and FIG. 16, in the operation programs 76 and 96, different types of movement in the linear manner from each other are performed according to the predetermined condition.

The operation program 76 includes operation icons 76*a* to 76*f* as operation symbols. The operation program 76 includes an auxiliary icon 76*p* as an auxiliary symbol. The auxiliary icon 76*p* has a division line so as to specify one group of operation icons 76*a* to 76*c* and the other group of operation icons 76*d* to 76*f*. The auxiliary icon 76*p* has a shape that extends in a horizontal direction of the screen of the display part 33*a* along a direction of a row. That is, the auxiliary icon 76*p* has a shape in which one group and the other group are aligned and displayed in one row.

The auxiliary icon 76*p* indicates control of determining whether or not the predetermined condition is met. When the condition specified by the auxiliary icon 76*p* is met, the robot apparatus performs operations indicated by the operation icons 76*a* to 76*c* arranged in the former section. When the condition specified by the auxiliary icon 76*p* is not met, the robot apparatus performs operations indicated by the operation icons 76*d* to 76*f* arranged in the latter section.

The operation program 96 in the text format includes command statements from a first row to a ninth row. The command statement in the first row, the command statement in the fifth row, and the command statement in the ninth row correspond to the auxiliary icon 76*p* in the operation program 76. The command statements from the second row to the fourth row correspond to the operation icons 76*a* to 76*c*. The command statements from the sixth row to the eighth row correspond to the operation icons 76*d* to 76*f*.

FIG. 17 illustrates a setting screen for an auxiliary icon for determining selection of an operation. In an image 66, the auxiliary icon 76*p* is selected, and the tab 112 for details is selected. A setting screen configured to set setting information 86 is displayed in an information display region. The setting information 86 includes a condition for making a determination.

With reference to FIG. 15 to FIG. 17, when a variable DI[1] indicating a digital input is set to ON, the operations specified by the operation icons 76*a* to 76*c* are performed. Then, when the variable DI[1] is not ON, the operations specified by the operation icons 76*d* to 76*f* are performed.

In this way, by using the auxiliary icon 76*p*, the operations of the robot apparatus can be selected according to the predetermined condition. In addition, the condition for making a determination can be set on the setting screen for the auxiliary icon 76*p*.

Figure 18:
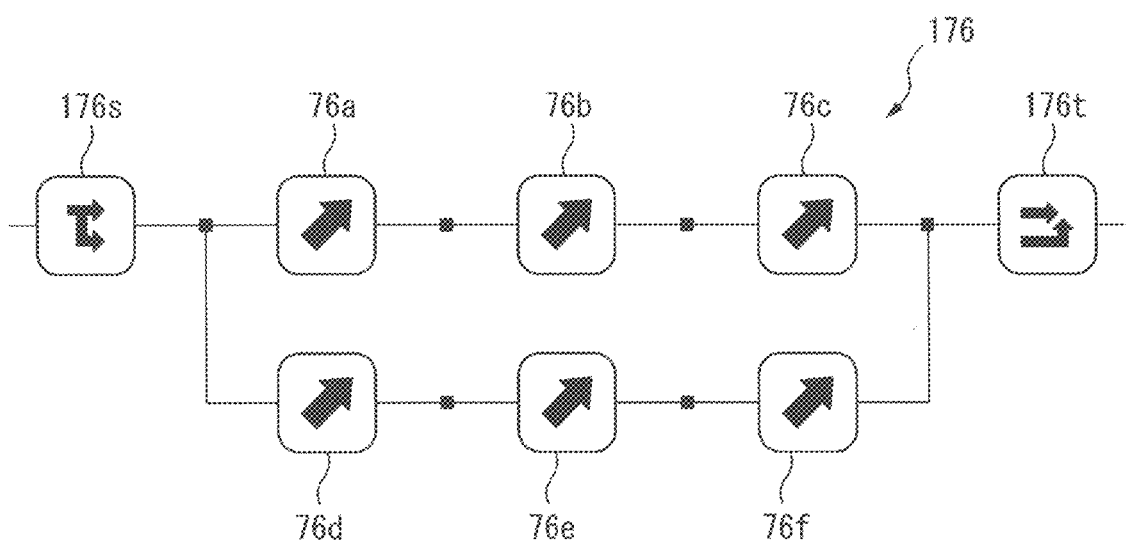
FIG. 18 is an operation program including a control icon of a reference example for changing an operation of the robot according to a predetermined condition.

FIG. 18 illustrates an operation program of a reference example in which an operation of a robot is changed according to a predetermined condition. An operation program 176 of the reference example includes branch icons 176*s* and 176*t* as control icons for performing control with respect to the operation of the robot. The branch icons 176*s* and 176*t* indicate similar control to the control by the auxiliary icon 76*p* illustrated in FIG. 15. The branch icon 176*s* indicates the start of a branch in a process of the operations of the robot, and the branch icon 176*t* indicates the end of the branch. In the branch icon 176*s*, when the predetermined condition is met, the operations specified by the operation icons 76*a* to 76*c* are performed. When the predetermined condition is not met, the operations specified by the operation icons 76*d* to 76*f* are performed.

In the operation program 176 of the reference example, a command for starting control with respect to operations of a robot apparatus is displayed with one icon, and a command for ending the control is displayed with one icon. In addition, rows in which the operations of the robot apparatus are aligned are branched. The operations of the robot apparatus are displayed in two rows. In the operation program 176 of the reference example, operation symbols indicating the operations of the robot apparatus are displayed in a plurality of rows.

In the operation program 176 of the reference example, since the operation program 176 is displayed in the plurality of rows, an information display region in which detailed information is displayed becomes small. For example, since a region for displaying a reference operation icon or a region for setting information of the operation icon in details becomes small, an operator needs to operate a scroll bar and the like in order to view the information displayed in the information display region. Therefore, it becomes difficult for the operator to generate an operation program. In contrast, in the operation program 76 including the auxiliary icon 76*p* illustrated in FIG. 15, the information display region can be prevented from becoming small because all of the operation icons 76*a* to 76*f* and the auxiliary icon 76*p* are aligned and displayed in one row. As a result, for the operator, the efficiency of the work of generating the operation program is improved.

Figure 19:
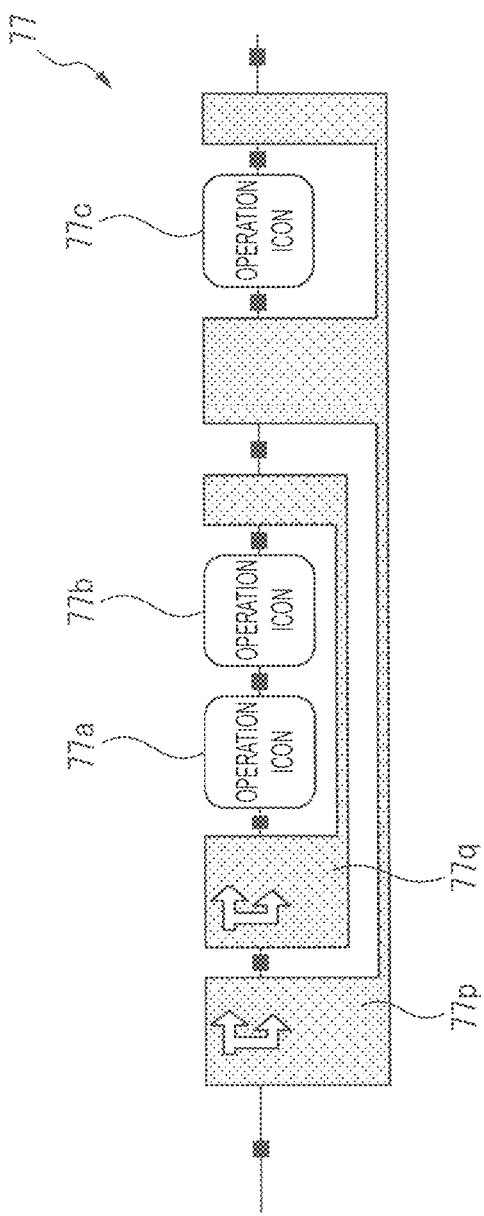
FIG. 19 is an operation program including two auxiliary icons for changing an operation of the robot according to a predetermined condition.

FIG. 19 illustrates an operation program including a plurality of auxiliary icons for selecting an operation of a robot apparatus. An operation program 77 includes operation icons 77*a* to 77*c* and auxiliary icons 77*p* and 77*q*. Each of the auxiliary icons 77*p* and 77*q* indicates control of selecting an operation of the robot apparatus according to a predetermined condition. In the operation program 77, a plurality of auxiliary icons 77*p* and 77*q* and operation icons 77*a* to 77*c* are aligned and displayed in one row.

In this control, when a condition specified by the auxiliary icon 77*p* is met, the control shifts to determination of the auxiliary icon 77*q*. Then, when a condition specified by the auxiliary icon 77*q* is met, operations by the operation icons 77*a* and 77*b* are performed. After this, the control shifts to an operation after the auxiliary icon 77*p*. When the condition specified by the auxiliary icon 77*q* is not met, the control shifts to the operation after the auxiliary icon 77*p* without performing the operations by the operation icons 77*a* and 77*b*. On the other hand, when the condition specified by the auxiliary icon 77*p* is not met, an operation by the operation icon 77*c* is performed.

The auxiliary icon 77*q* as the first auxiliary symbol specifies the operation icons 77*a* and 77*b*. Also, the auxiliary icon 77*p* as the second auxiliary symbol specifies the auxiliary icon 77*q*. In the operation program 77, the other auxiliary icon 77*q* is arranged inside one auxiliary icon 77*p*. In this way, a plurality of auxiliary icons for controlling the determination can be combined.

Figure 20:
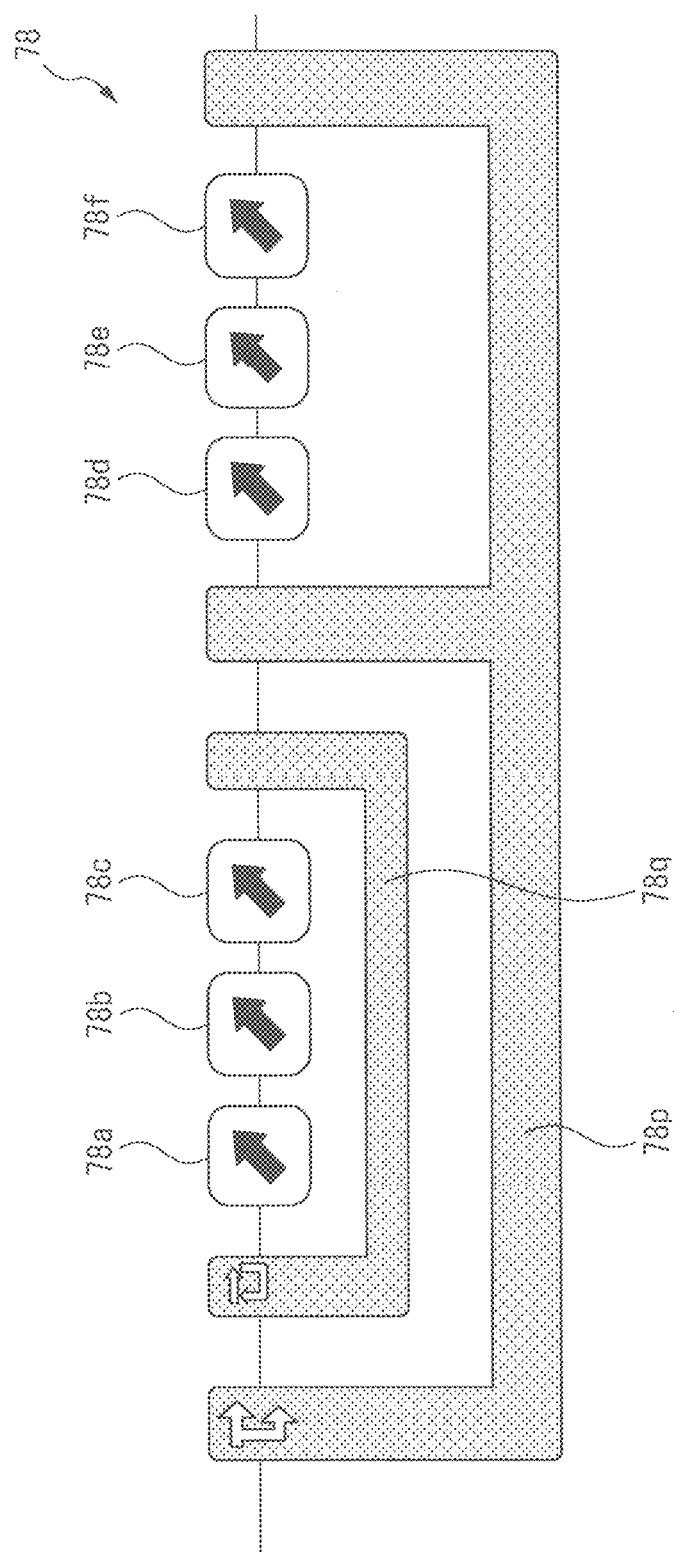
FIG. 20 is an operation program in which an auxiliary icon for changing an operation of the robot according to a predetermined condition and an auxiliary icon for repeating an operation of the robot are combined.

FIG. 20 illustrates an operation program with different types of auxiliary symbols combined. An operation program 78 includes operation icons 78*a* to 78*c* and operation icons 78d to 78f. The operation program 78 includes an auxiliary icon 78p for selecting an operation of the robot apparatus according to a predetermined condition and an auxiliary icon 78q for performing control of repeating an operation of the robot apparatus. In the operation program 78, the other auxiliary icon 78q is arranged inside one auxiliary icon 78p. The plurality of auxiliary icons 78p and 78q and operation icons 78a to 78f are aligned and displayed in one row.

In the operation program 78, when the condition specified by the auxiliary icon 78p is met, operations by the operation icons 78a to 78c are repeated by the auxiliary icon 78q. When the condition specified by the auxiliary icon 78p is not met, operations by the operation icons 78d to 78f are performed.

Figure 21:
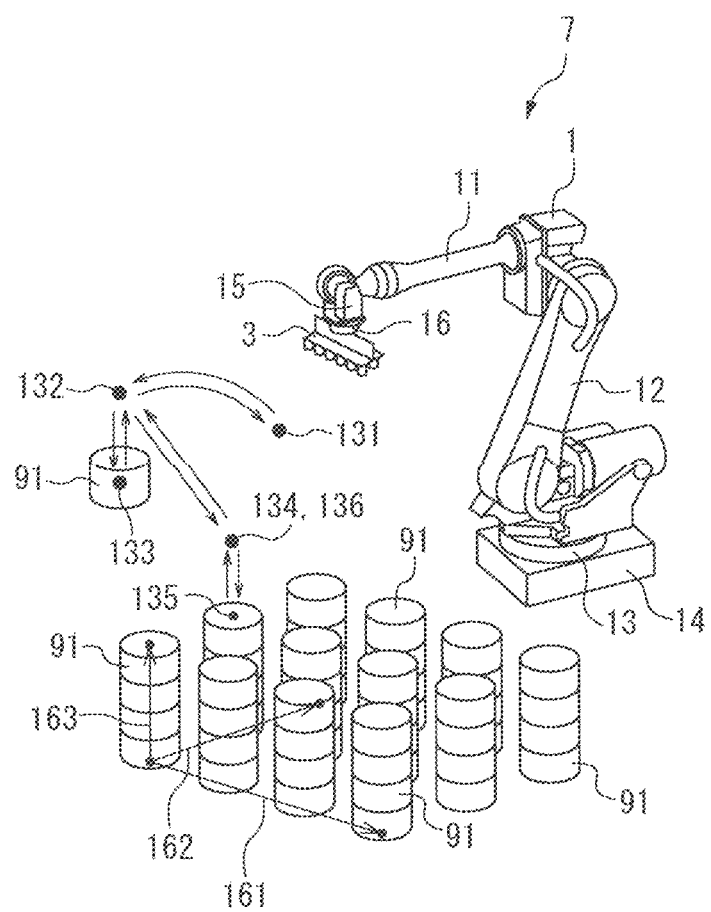
FIG. 21 is a perspective view of a robot apparatus that performs palletizing of workpieces and workpieces.

Next, an auxiliary symbol for correcting an operation of the robot apparatus specified by an operation symbol will be described. FIG. 21 is a perspective view illustrating another robot apparatus of the present embodiment. In a robot apparatus 7, a hand 3 is attached to the robot 1. The hand 3 grips a workpiece 91 by suction. The other part of the configuration of the robot apparatus is similar to that of the configuration of the robot apparatus illustrated in FIG. 1 and FIG. 2.

The robot apparatus 7 performs palletizing in which the workpieces 91 transported by a conveyor or the like is stacked in a predetermined region. In the region where the workpieces 91 are stacked, an arrow 161 indicates a direction of rows of the workpieces 91, an arrow 162 indicates a direction of columns of the workpieces 91, and an arrow 163 indicates a direction of stages of the workpieces 91. The robot apparatus 7 according to the present embodiment performs work for stacking the workpieces 91 in four rows, three columns, and four stages.

Figure 22:
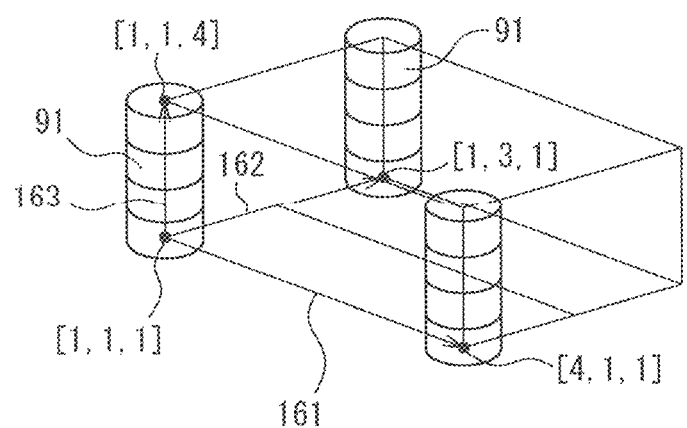
FIG. 22 is a perspective view illustrating positions of workpieces which the robot apparatus arranges.

FIG. 22 is a perspective view for describing a region where workpieces are stacked. FIG. 22 illustrates the workpieces 91 arranged at an end position with respect to rows, columns, and stages for stacking the workpieces 91. For example, a position of the workpiece 91 at a first row, a first column, and a first stage can be represented by [1, 1, 1]. A position of the workpiece 91 at a fourth row, the first column, and the first stage can be represented by [4, 1, 1].

Referring to FIG. 21 and FIG. 22, the robot 1 is driven, and a tool center point (position of the robot 1) is first moved to a movement point 131. Next, the tool center point moves from the movement point 131 via a movement point 132 to a movement point 133. The robot apparatus 7 grips the workpiece 91 at the movement point 133. Next, the tool center point of the robot apparatus 7 moves to a movement point 134 via the movement point 132.

Figure 23:
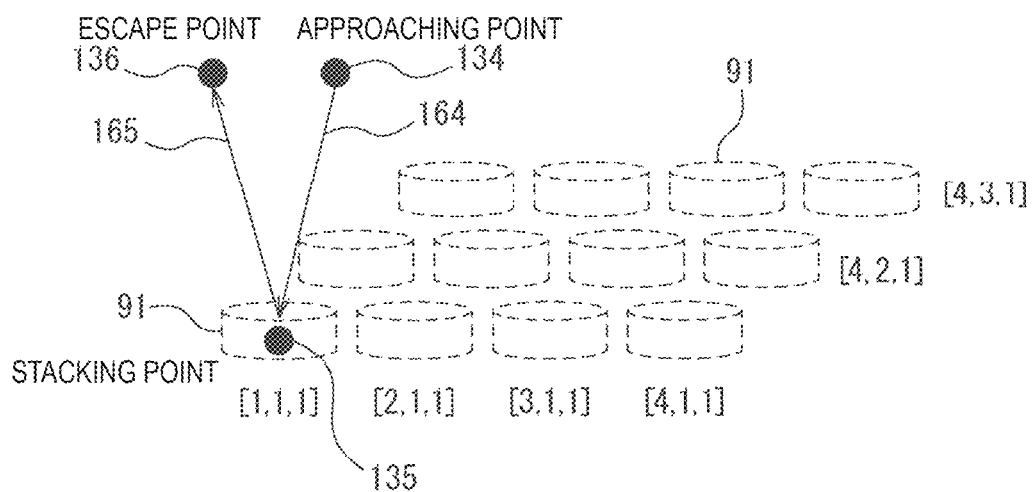
FIG. 23 is a first perspective view illustrating positions of the robot when the robot apparatus arranges workpieces.

FIG. 23 is a perspective view for describing an operation of the robot apparatus when one workpiece is stacked. Referring to FIG. 21 to FIG. 23, the movement point 134 corresponds to an approaching point. The robot apparatus 7 moves the tool center point to a movement point 135 as a stacking point for stacking the workpiece 91, as indicated by an arrow 164. At the movement point 135, the robot apparatus 7 releases the workpiece 91 and thus arranges the workpiece 91 at the stacking point.

Next, as indicated by an arrow 165, the robot apparatus 7 moves the tool center point to a movement point 136 as an escape point. Thereafter, the tool center point of the robot apparatus 7 returns to the movement point 131 after passing through the movement point 132. By repeating this operation, the robot apparatus 7 can stack the workpieces 91 one by one in the predetermined region.

In the control illustrated in FIG. 23, the workpiece 91 is arranged at a stacking point of the first row, the first column, and the first stage. In the present embodiment, the movement point 134 as the approaching point, the movement point 135 as the stacking point, and the movement point 136 as the escape point are corrected according to a position at which the workpiece 91 is to be arranged. When positions (a position [1, 1, 1], a position [4, 1, 1], a position [1, 3, 1], and a position [1, 1, 4]) of four ends illustrated in FIG. 22 are set, the robot controller 4 can calculate all positions for arranging the workpieces 91 by interpolation of the four positions. The robot controller 4 corrects the position of the robot 1 such that the calculated position is the position of the stacking point of the workpiece 91.

Figure 24:
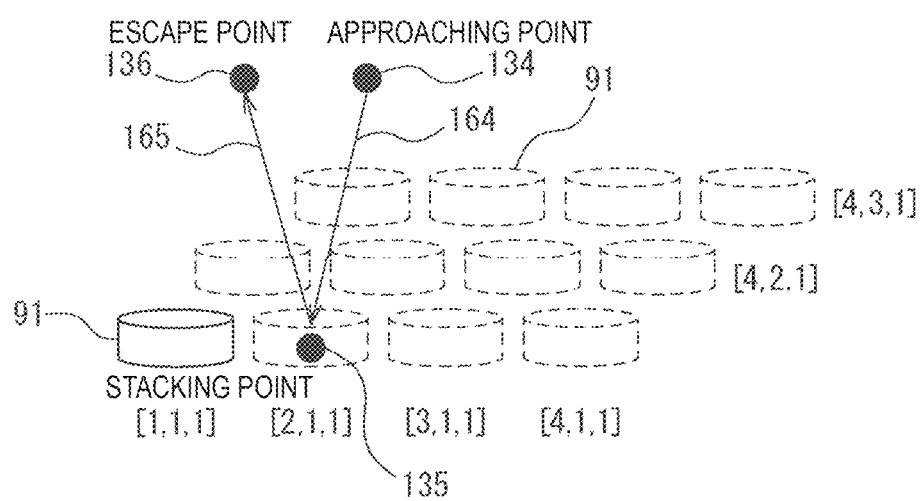
FIG. 24 is a second perspective view illustrating positions of the robot when the robot apparatus arranges the workpieces.

FIG. 24 is a perspective view for describing an operation of the robot apparatus when another workpiece is stacked. FIG. 24 illustrates an operation of arranging a workpiece at a stacking point of a second row, the first column, and the first stage. As control of correcting a position where the robot apparatus 7 arranges the workpiece 91, the robot controller 4 may arrange the workpiece while correcting the position in a direction of rows, columns, or stages. For example, the robot controller 4 may correct the position in the direction of the rows from a position of the first row illustrated in FIG. 23, and calculate the position of the second row illustrated in FIG. 24.

The robot apparatus 7 of the present embodiment can correct the position of the robot 1, and arrange the workpiece in the first column. After the arrangement of the workpieces in the first row is completed, the robot apparatus 7 can arrange workpieces in the second column and the third column by similar control. After the arrangement of the workpieces of the first stage is completed, the robot apparatus 7 can arrange workpieces from the second stage to the fourth stage. Note that order in which the workpieces are stacked can be set to any order. Further, as the number of workpieces, any number can be set.

Figure 25:
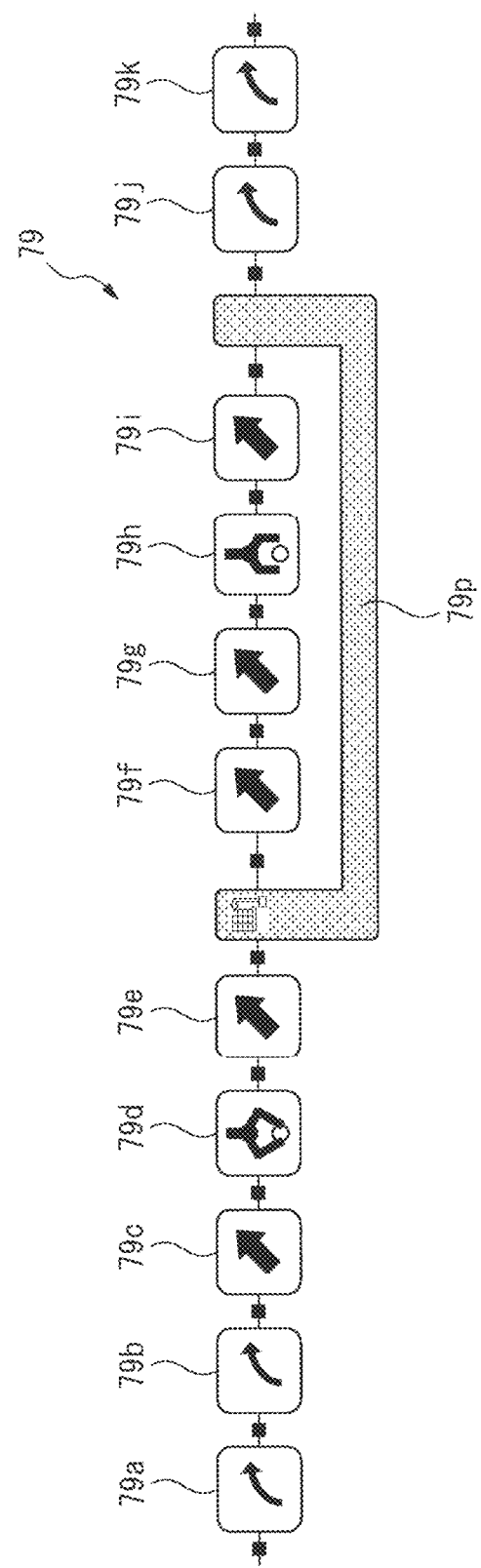
FIG. 25 is an operation program including an auxiliary icon for performing palletizing by the robot apparatus.

FIG. 25 illustrates an operation program for performing palletizing. An operation program 79 includes operation icons 79a to 79k. The operation icon 79a indicates movement to the movement point 131. The operation icons 79b and 79c indicate movement from the movement point 131 to the movement point 133. The operation icon 79d indicates the operation in which the hand 3 grips the workpiece 91. The operation icon 79e indicates movement from the movement point 133 to the movement point 132.

Next, control of correcting the position of the robot 1 is performed for palletizing. The operation program 79 includes an auxiliary icon 79p for correcting the position of the robot 1. The auxiliary icon 79p specifies the operation icons 79f to 79i. The operation icon 79f indicates movement to the movement point 134 as an approaching point. The operation icon 79g indicates movement to the movement point 135 as a stacking point. The operation icon 79h indicates an operation in which the hand 3 releases the workpiece 91. The operation icon 79i indicates movement to the movement point 136 as an escape point.

In setting screens of the operation icons 79f, 79g, and 79i, the position and the orientation of the robot 1 are set such that the movement point 134, the movement point 135, and the movement point 136 are at predetermined relative positions. For example, in setting information of the operation icons 79f, 79g, and 79i, coordinate values are set such that the approaching point, the stacking point, and the escape point are arranged at the relative positions as illustrated in FIG. 23.

Figure 26:
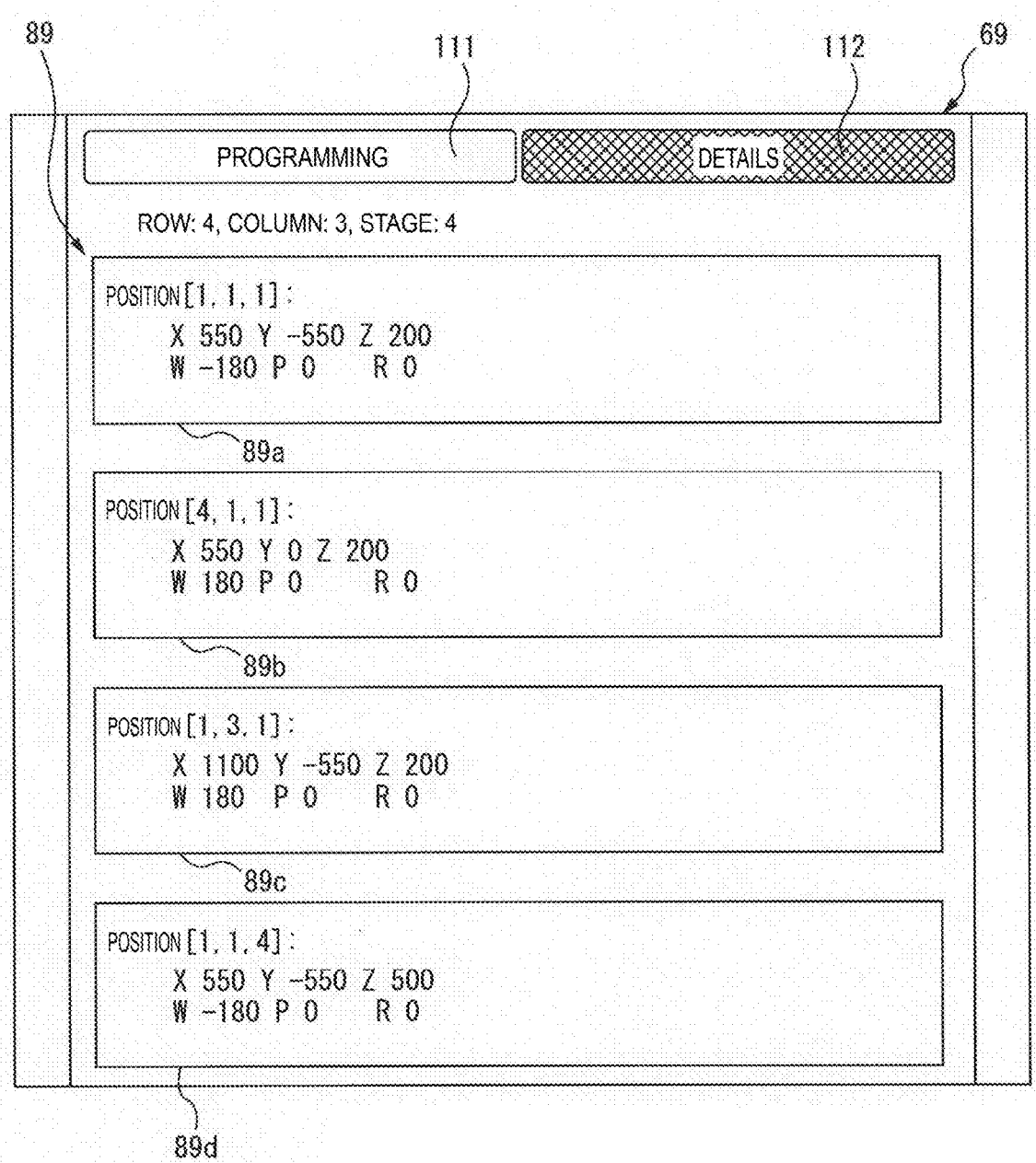
FIG. 26 is a screen configured to set conditions of an auxiliary icon for performing palletizing by the robot apparatus.

FIG. 26 illustrates a setting screen for an auxiliary icon for correcting an operation of the robot apparatus. FIG. 26 illustrates an overall image that can be viewed by an operation of a scroll bar. The operator selects the auxiliary icon 79p, and thus the tab 112 for details is selected. Setting information 89 is displayed on the setting screen in an image 69. The setting information 89 is set with information related to correction of the operation of the robot apparatus 7. Referring to FIG. 22 and FIG. 26, the setting information 89 includes the positions of the movement points that are at the ends of the region where the workpieces 91 are arranged. The setting information 89 includes pieces of position information 89a to 89d. The respective pieces of position information 89a to 89d include coordinate values of the position [1, 1, 1], coordinate values of the position [4, 1, 1], coordinate values of the position [1, 3, 1], and coordinate values of the position [1, 1, 4]. The robot controller 4 calculates the positions at which the workpieces 91 are arranged by interpolating the end positions where the workpieces are arranged.

The robot controller 4 selects one position in which the workpiece 91 is arranged. The robot controller 4 corrects the positions of target movement points set by the operation icons 79f, 79g, and 79i. The robot controller 4 corrects the positions of the escape point, the approaching point, and the stacking point such that the position where the workpiece 91 is to be arranged coincides with the movement point 135 which is the stacking point.

The robot controller 4 arranges the workpiece 91 while changing the position of the robot 1 so as to pass through the calculated escape point, approaching point, and stacking point. In this way, the auxiliary icon 79p can specify a function of correcting the position of the robot. Note that the auxiliary icon may specify a function of correcting the orientation of the robot.

With reference to FIG. 25, the operation program 79 includes the operation icons 79j and 79k. After the arrangement of the workpiece 91 by the auxiliary icon 79p ends, the tool center point of the robot apparatus 7 moves from the movement point 136 as the escape point through the movement point 132 to the movement point 131 by the operation icons 79j and 79k.

The robot controller 4 can repeat the operation program 79 after the arrangement of one workpiece 91 ends. In the present embodiment, the operation program 79 can be repeated 48 times in order to arrange 48 workpieces 91. In order to perform this control, an auxiliary icon for repeating the operation of the robot apparatus may be arranged in the operation program. Alternatively, the operation program 79 may be called by another operation program and may be set so as to execute the operation program 79 a plurality of times.

The auxiliary icon 79p indicates control of correcting the operation of the robot apparatus. By employing this auxiliary icon, the operator can define a basic operation of the robot apparatus by an operation icon. The operation of the robot apparatus can be corrected based on the basic operation. When all the operations of the robot apparatus are specified by the operation icons, many operation icons need to be generated. However, by employing the auxiliary icon indicating control of correcting the operation of the robot apparatus, the number of operation icons can be reduced. In addition, the operator facilitates the generation of the operation program, thereby improving the efficiency of the work of generating the operation program.

The auxiliary icon 79p described above indicates control of correcting the operation of the robot, but the embodiment is not limited to this. The auxiliary icon may indicate control of correcting an operation of the operation tool. Further, any control of correcting the operation of the robot apparatus defined by the operation icon can be performed. For example, control of correcting the position and the orientation of the robot can be performed based on information acquired from a sensor. A vision sensor, a vibration sensor, a force sensor, and the like can be used as the sensor. For example, an amount of positional misalignment of a workpiece gripped by the robot apparatus is detected by the vision sensor. The robot controller can perform control of correcting the position and the orientation of the robot based on the amount of the positional misalignment of the workpiece. Such an auxiliary icon for correcting the operation of the robot can be included in the operation program.

Figure 27:
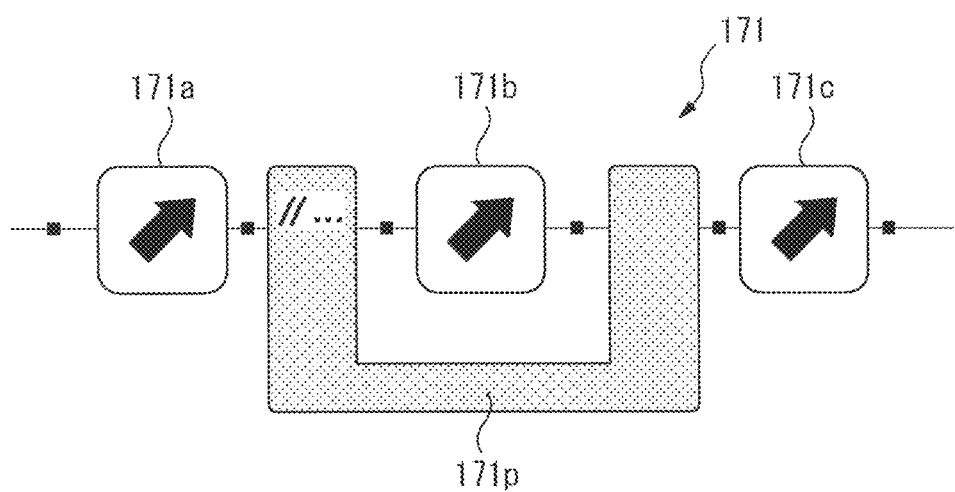
FIG. 27 is an operation program including an auxiliary icon for disabling some operations of the robot apparatus.

FIG. 27 illustrates an operation program including an auxiliary icon for disabling an operation by an operation icon. An operation program 171 includes operation icons 171a to 171c. The operation program 171 includes an auxiliary icon 171p as an auxiliary symbol for disabling a command for an operation by an operation symbol. An operation of the operation icon 171b specified by the auxiliary icon 171p can be disabled. In the example illustrated in FIG. 27, when the operation program 171 is executed, the operation of the robot 1 is performed by the operation icon 171a. Next, the operation of the robot 1 is performed by the operation icon 171c without performing the operation of the robot 1 by the operation icon 171b. In this way, as a predetermined control to the operation by the operation symbol, the auxiliary symbol for disabling the command for the operation by the operation symbol can be set.

Figure 28:
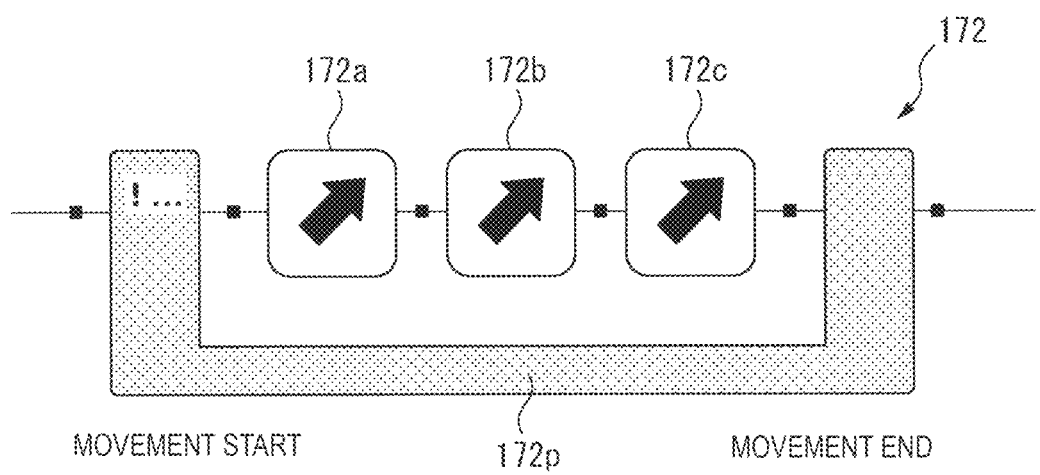
FIG. 28 is an operation program including an auxiliary icon for imparting comments to operation icons.

FIG. 28 illustrates an operation program including an auxiliary icon for imparting comments to operation icons. An operation program 172 includes operation icons 172a to 172c and an auxiliary icon 172p. The auxiliary icon 172p has a function of displaying an explanatory sentence with respect to an operation of the robot apparatus. The operation of the robot apparatus does not change even when the auxiliary icon 172p is arranged. In the example illustrated in FIG. 28, by the auxiliary icon 172p, the start of movement and the end of the movement of the position of the robot 1 are displayed. In this way, the operation program may include the auxiliary icon for displaying the explanatory sentence.

In the above-described embodiment, the operation icons and the auxiliary icon are aligned and displayed in the horizontal direction of the screen of the display part. That is, while the operation icons and the auxiliary icon are aligned and displayed in one row, and the operation program is generated by the one row, the embodiment is not limited to this. The operation icons and the auxiliary icon may be aligned and displayed in one column. Next, an example in which operation icons and an auxiliary icon are aligned and displayed in a single column will be described.

Figure 29:
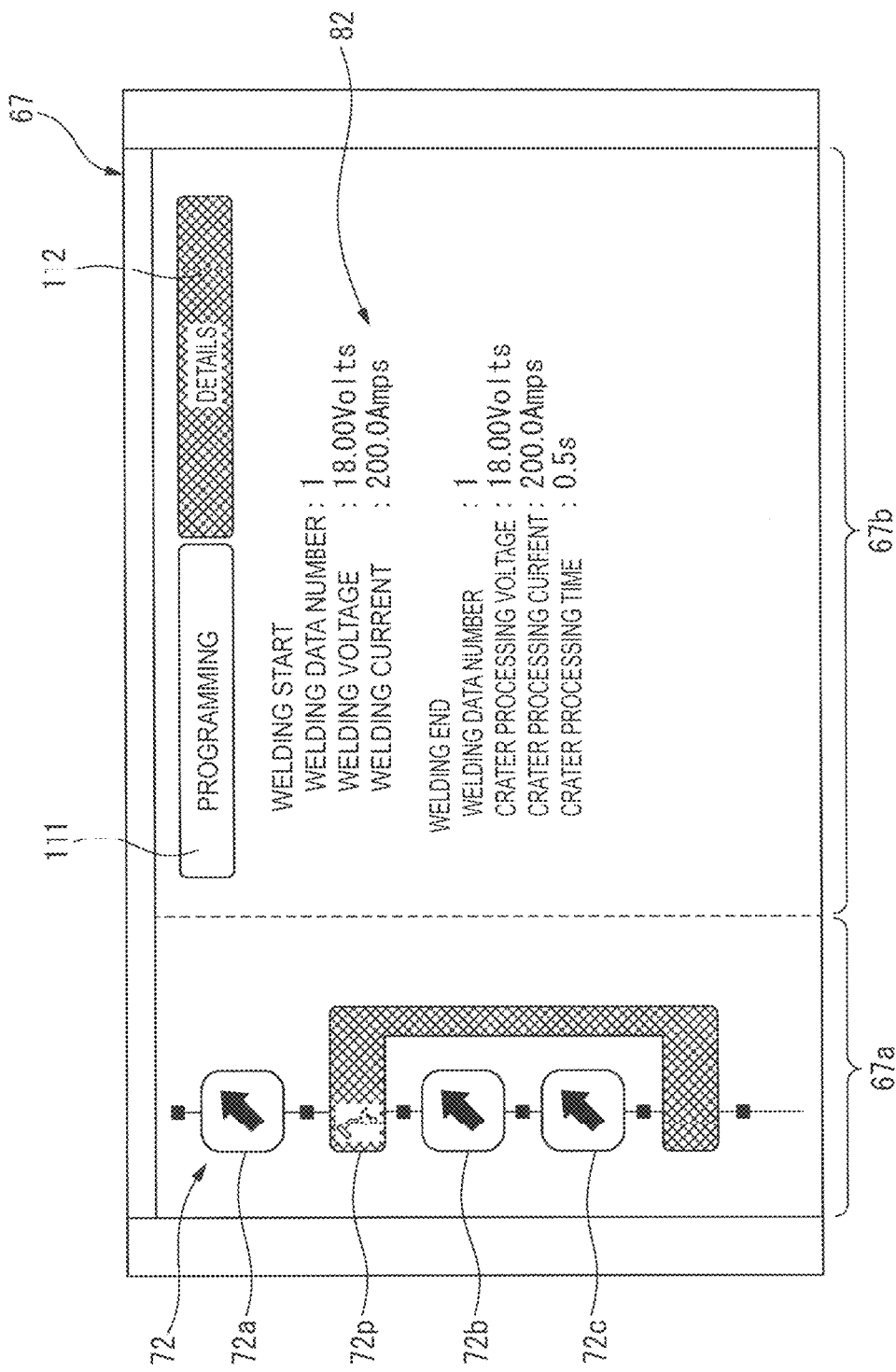
FIG. 29 is an image of a mobile terminal on which an operation program is displayed in a vertical direction.

FIG. 29 illustrates an image of a mobile terminal in which an operation program is displayed in a vertical direction. In an image 67, similar contents to those of the image 62 illustrated in FIG. 7 are displayed. In the image 67, the operation program 72 including the auxiliary icon 72p is displayed as an auxiliary symbol for adding an operation of the robot apparatus. In the image 67, all of the operation icons 72a to 72c and the auxiliary icon 72p are aligned and displayed in one column in order of operations of the robot apparatus. A program display region 67a is set in an end portion on a left side of the screen of the display part 33a. In the program display region 67a, the operation program 72 is displayed such that the operation icons 72a to 72c and the auxiliary icon 72p are aligned in the vertical direction. On a right side of the program display region 67a, an information display region 67b for displaying detailed information related to the generation of the operation program 72 is set.

Figure 30:
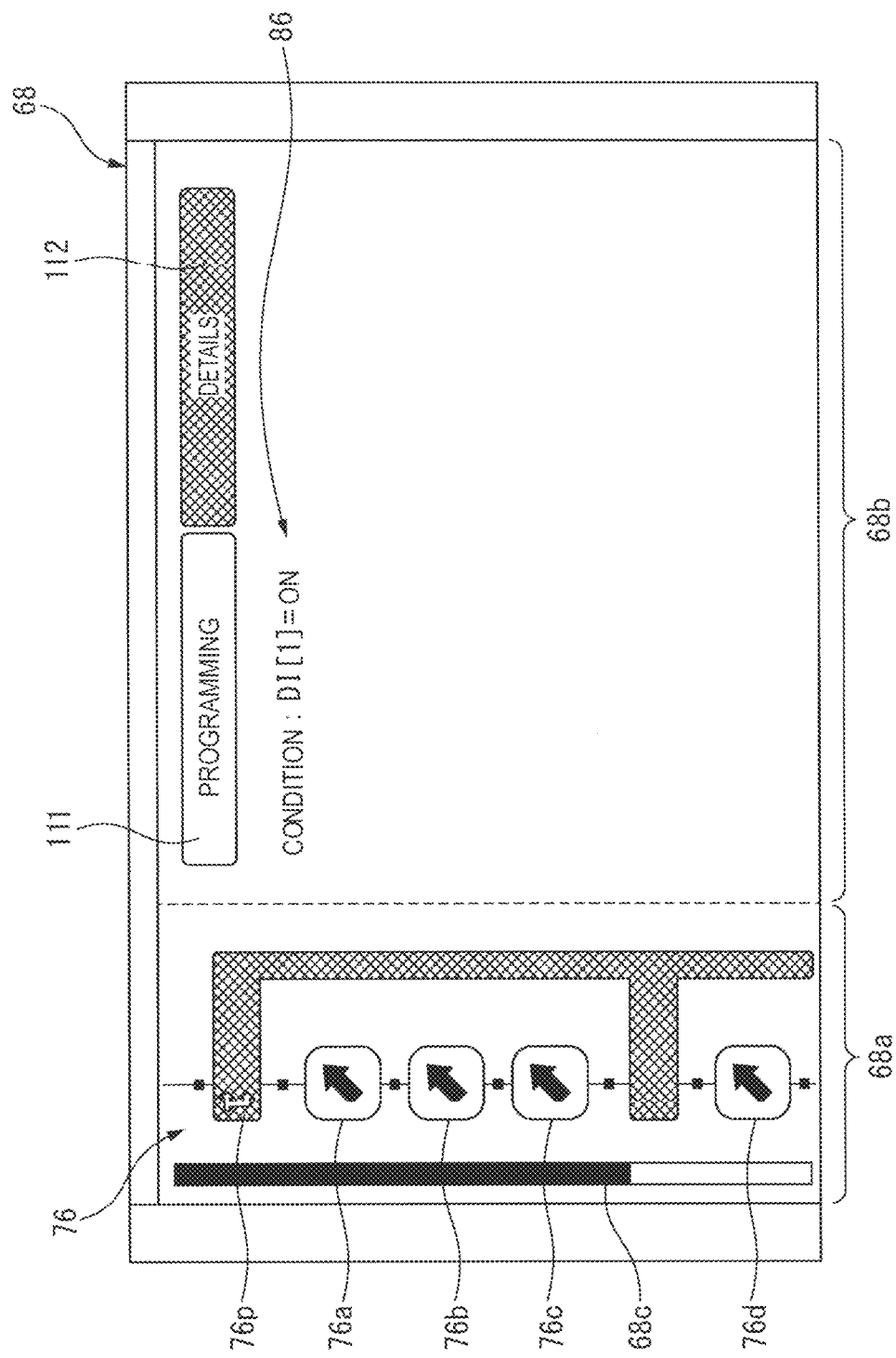
FIG. 30 is another image of the mobile terminal on which the operation program is displayed in the vertical direction.

FIG. 30 illustrates another image of the mobile terminal in which the operation program is displayed in the vertical direction. An image 68 corresponds to the images illustrated in FIG. 15 and FIG. 17. The operation program 76 is displayed in the image 68. The operation program 76 includes the auxiliary icon 76p as an auxiliary symbol for performing a predetermined control with respect to the operation by the operation symbol. The operator can view any part of the operation program 76 by moving a scroll bar 68c. The auxiliary icon 76p has a shape in which one group of operation icons 76a to 76c and the other group of operation icons 76d to 76f are aligned and displayed in one column.

Also in the image 68, all of the operation icons 76a to 76f and the auxiliary icon 76p are aligned and displayed in one column in order of operations of the robot apparatus. In the program display region 68a, the operation program 76 is displayed such that the operation icons 76a to 76d and the auxiliary icon 76p are aligned in the vertical direction. On a right side of the program display region 68a, an information display region 68b for displaying detailed information related to the generation of the operation program 76 is set.

Thus, also in the program generation device in which the operation icons and the auxiliary icon are aligned and displayed in one column, the operator can easily understand a section specified by the auxiliary icon. Also, the operator can simultaneously view the operation program and the information display region. For this reason, the efficiency of generating the operation program is improved. Other configurations, actions, and effects are not repeatedly described here because they are similar to those in a case of the above-described control where the operation icons and the auxiliary icon are aligned and displayed in one row.

Further, the operation program may include a control icon for branching into a plurality of rows as in the reference example illustrated in FIG. 18. Alternatively, the operation program may include a control icon for branching into a plurality of columns. Even in the operation program including such a control icon, an auxiliary icon that indicates the control of adding an operation of the robot apparatus can be included. The operation program may also include an auxiliary icon indicating the control of correcting an operation of the robot apparatus defined by an operation symbol.

In the above-described embodiment, although the method in which the operation program is generated from scratch, the embodiment is not limited to this. The configuration of the present embodiment can also be applied to a program generation device that generates a new operation program by modifying the operation program generated in the past.

According to an aspect of the present disclosure, the program generation device can be provided that improves the efficiency of work for generating an operation program.

The above embodiment can be modified as appropriate. In each of the above-described drawings, the same or equivalent portions are denoted by the same reference numerals. It should be noted that the above-described embodiment is an example and do not limit the invention. In addition, the embodiment includes modifications of the embodiment described in the claims.

The invention claimed is:

1. A program generation device comprising:
    a display;
    at least one memory configured to store
        an operation symbol including information in relation to an operation command of a robot, and
        an auxiliary symbol including information in relation to a control command for adding an operation of the robot or for correcting the operation of the robot defined by at least one operation symbol; and
    at least one processor configured to
        obtain information in relation to setting of at least one of the operation symbol or the auxiliary symbol, and
        cause the display to display the operation symbol and the auxiliary symbol so as to align the operation symbol and the auxiliary symbol in order of operations of the robot based on the obtained information in relation to setting.

2. The program generation device according to claim 1, wherein
    the at least one processor is further configured to cause the display to display the auxiliary symbol so as to sandwich or surround the at least one operation symbol.

3. The program generation device according to claim 1, wherein
    the at least one processor is further configured to cause the display to display the auxiliary symbol so as to specify the at least one operation symbol.

4. The program generation device according to claim 1, wherein
    the at least one processor is further configured to cause the display to display the operation symbol and the auxiliary symbol as information in relation to an operation program.

5. The program generation device according to claim 1, wherein
    the information in relation to the control command includes at least one of a command of repeating the operation of the robot defined by the at least one operation symbol, a command of disabling the operation of the robot defined by the at least one operation symbol, a command of determining whether the operation of the robot defined by the at least one operation symbol satisfies a predetermined condition, or a command of changing condition of the operation of the robot defined by the at least one operation symbol.

6. The program generation device according to claim 1, wherein
    the information in relation to setting includes information set by an operator operating an image displayed on the display to set the operation symbol or the auxiliary symbol.

7. The program generation device according to claim 1, wherein
    the at least one processor is further configured to cause the display to display an operation program written in text format corresponding to the operation symbol and the auxiliary symbol.

8. The program generation device according to claim 1, wherein
    the information in relation to setting includes information set by an operator operating an image displayed on the display to set the operation program written in text format.

9. The program generation device according to claim 1, wherein
    the auxiliary symbol includes a start and an end of the added operation of the robot.

10. The program generation device according to claim 1, wherein
    the at least one processor is further configured to cause the display to display the auxiliary symbol in a closed state or an opened state, and display the opened state so as to display the at least one operation symbol sandwiched or surrounded by the auxiliary symbol.

11. The program generation device according to claim 4, wherein the information in relation to the operation program includes a plurality of auxiliary symbols, a first auxiliary symbol in plurality of auxiliary symbols specifies the at least one operation symbol, and a second auxiliary symbol in the plurality of auxiliary symbols specifies at least the first auxiliary symbol.

12. The program generation device according to claim 1, wherein the information in relation to the control command includes a command in relation to a specific task of the robot, and the command in relation to the specific task includes at least one of a command of adding or correcting a welding task, a command of adding or correcting a palletizing task, a command of adding or correcting a task of picking a workpiece transported by a conveyor, or a command of correcting a position and an orientation of the robot performed based on information obtained from a sensor.

13. The program generation device according to claim 12, wherein the at least one processor is further configured to cause the display to display the auxiliary symbol having a diagram corresponding to the command in relation to the specific task.

14. The program generation device according to claim 4, wherein the at least one processor is further configured to cause the display to display the auxiliary symbol with a comment corresponding the operation of the robot.

15. The program generation device according to claim 12, wherein the sensor includes at least one of a vision sensor, a vibration sensor, or a force sensor.

16. The program generation device according to claim 4, wherein the operation symbol or the auxiliary symbol is expressed by an icon.

17. A non-transitory computer readable storage medium storing a program to generate an operation program of a robot, which, when executed by a computer, causes the computer to obtain information in relation to setting of at least one of an operation symbol or an auxiliary symbol, and cause a display to display the operation symbol and the auxiliary symbol so as to align the operation symbol and the auxiliary symbol in order of operations of the robot based on the obtained information in relation to setting, wherein the operation symbol includes information in relation to an operation command of the robot, and the auxiliary symbol includes information in relation to a control command for adding an operation of the operations of the robot or for correcting the operation of the robot defined by at least one operation symbol.

18. A method of generating an operation program of a robot, the method comprising:

obtaining information in relation to setting of at least one of an operation symbol or an auxiliary symbol, and causing a display to display the operation symbol and the auxiliary symbol so as to align the operation symbol and the auxiliary symbol in order of operations of the robot based on the obtained information in relation to setting, wherein the operation symbol includes information in relation to an operation command of the robot, and the auxiliary symbol includes information in relation to a control command for adding an operation of the operations of the robot or for correcting the operation of the robot defined by at least one operation symbol.

* * * * *